US012748194B1

(12) United States Patent
Angus et al.

(10) Patent No.: US 12,748,194 B1
(45) Date of Patent: Sep. 29, 2026

(54) DRIVE CONTROL FOR A SCANNER OF A LIDAR SYSTEM

(71) Applicant: Aurora Operations, Inc., Pittsburgh, PA (US)

(72) Inventors: Edward Angus, Bozeman, MT (US); Christoffer James Renner, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 19/327,774

(22) Filed: Sep. 12, 2025

(51) Int. Cl.

| | |
|---|---|
| ***G02B 26/08*** | (2006.01) |
| ***G01D 5/22*** | (2006.01) |
| ***G01D 5/246*** | (2006.01) |
| ***G01S 7/481*** | (2006.01) |
| ***G01S 17/93*** | (2020.01) |

(52) U.S. Cl.
CPC ............ *G01S 7/4817* (2013.01); *G01D 5/225* (2013.01); *G01D 5/246* (2013.01); *G01S 17/93* (2013.01)

(58) Field of Classification Search
CPC ....... G01S 7/4817; G01S 17/93; G01D 5/225; G01D 5/246; G02B 26/08
See application file for complete search history.

(56) References Cited

U.S. PATENT DOCUMENTS

| | | | | |
|---|---|---|---|---|
| 11,567,213 | B2 * | 1/2023 | Wang | G02B 7/1821 |
| 2007/0173057 | A1 | 7/2007 | Lee et al. | |
| 2018/0284279 | A1 * | 10/2018 | Campbell | G01S 7/4817 |
| 2019/0137610 | A1 * | 5/2019 | Li | G01S 17/931 |
| 2024/0118392 | A1 | 4/2024 | Rekow et al. | |
| 2024/0168206 | A1 | 5/2024 | Meng et al. | |

FOREIGN PATENT DOCUMENTS

| | | | |
|---|---|---|---|
| DE | 10 2013223933 | B4 | 12/2021 |

OTHER PUBLICATIONS

Pei et al. "A Novel Family of Leaf-Type Compliant Joints: Combination of Two Isosceles-Trapezoidal Flexural Pivots." (Jan. 7, 2009) Journal of Mechanisms and Robotics, vol. 1., May 2009. 021005-1-021005-6. https://doi.org/10.1115/1.3046140. 6 pgs.
Wikipedia, "Fatigue Limit", (N.D.), https://en.wikipedia.org/wiki/Fatigue_limit, retrieved on Sep. 12, 2025, 7 pgs.
Edward Angus, U.S. Appl. No. 19/327,776, filed Sep. 12, 2025, Scanner for a Lidar System.

* cited by examiner

*Primary Examiner* — Euncha P Cherry
(74) *Attorney, Agent, or Firm* — Dority & Manning P.A

(57) ABSTRACT

A light detection and ranging (LIDAR) system includes a light source to emit light and a scanner. The scanner includes a fixed first portion including one or more coils, a rotatable second portion including one or more magnets and flexure components which oscillate in response to the one or more coils being driven, a scan element to rotate via rotation of the rotatable second portion and to direct the light emitted by the light source to an environment of a vehicle, an encoder to output a first signal indicating position or direction information associated with rotation of the rotatable second portion when the one or more coils are driven, and one or more controllers to provide an input associated with driving the one or more coils and to adjust the input based on the first signal output by the encoder and a second signal associated with the input.

20 Claims, 17 Drawing Sheets

DRIVE CONTROL FOR A SCANNER OF A LIDAR SYSTEM

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

The emitter and/or receiver often includes photonic circuitry formed on a semiconductor substrate such as a silicon die. Silicon photonics dies can provide for precise formation of the photonic circuitry through, for example, photolithography. Other optical components of a LIDAR system may also be formed on semiconductor substrates, while still others are formed on or connected to components made using other semiconductor materials such as, for example, a group III-V semiconductor, gallium arsenide (GaAs), and/or other suitable materials.

SUMMARY

Aspects and advantages of implementations of the disclosure will be set forth in part in the following description, or may be learned from the description, or may be learned through practice of the implementations.

Example aspects of the disclosure relate to a scanner for a LIDAR system. Example aspects of the disclosure also relate to a drive control system for a resonant scanner of a LIDAR system.

Resonant scanners are electro-opto-mechanical devices that use the concept of mechanical resonance to achieve large scanning angles while maintaining low power consumption. This allows for very large mirrors to be scanned in a repeatable motion without the need for large drive electronics or active cooling. Although they have moving parts, they do not have wearing parts (e.g., no kinetic friction) meaning that a properly designed resonant scanner can last indefinitely.

Described herein are systems and methods associated with a scanner for a LIDAR system. For example, described herein is a resonant scanner having a metal sub-structure configured to rotate a mirror, where the metal sub-structure does not have any wearing parts and is highly durable. The metal sub-structure includes a flexure component including a plurality of spring components (e.g., leaf-springs) which are configured to be driven at their natural resonant frequency which cause the mirror to be rotated. The mirror can be rotated over a large range (e.g., over 80 degrees of scan angle) and thus has a large field of view while consuming a low amount of power (e.g., less than ten watts, less than five watts, etc.). Further, performance of the resonant scanner remains stable in adverse environments. For example, performance of the resonant scanner remains stable in high vibration, high impact, high acceleration environments, over a wide range of temperatures. This can be particularly advantageous for LIDAR systems operating in vehicle applications such as for autonomous vehicle control.

The resonant scanners according to examples of the disclosure include a flexure component having a high-deflection compound beam geometry and an on-axis transverse mirror mounting for collision-free high deflection angles. The configuration of the metal sub-structure further allows for installing drive and sense electronics in a compact manner while the metal spring components of the flexure component are formed of treated materials having a high deflection performance.

Existing LIDAR systems include LIDAR systems having micro electromechanical machines (MEMS) components which are formed of silicon (e.g., silicon crystals). However, utilizing MEMS components constrains the size of the mirror (e.g., to about 15 millimeters) and performance can be susceptible to and degraded by vibrations. Existing LIDAR systems also include LIDAR systems having polygon scanners, however the polygon scanners may have a limited field of view and utilize motor and/or gear mechanisms to rotate the polygon mirror which are susceptible to wear and failure over time.

A first example of the disclosure is directed to a LIDAR system including a first resonant scanner configured to direct light emitted from a light source of a LIDAR engine to an environment of a vehicle. The first resonant scanner may include a structural component and a scan element (mirror) mounted to the structural component. The structural component may include a stator portion (first portion) and a rotor portion (second portion).

In the first example, the first portion can include one or more coils (e.g., voice coils, air coils, drive coils, etc.), an encoder (e.g., a quadrature encoder), one or more controllers (e.g., microcontrollers), and one or more drive circuits (e.g., H-bridge circuits). The second portion can include a first plurality of flexure components (a first flexure stage) and one or more magnets (permanent magnets) which are disposed to face the one or more coils. The structural component can further include a second plurality of flexure components (a second flexure stage) which is coupled to the first portion (e.g., a rigid body disposed on the first portion) and the second portion (e.g., a pivot body having an axis of rotation about which the second portion rotates). The scan element (e.g., a mirror) may be mounted to the second portion (e.g., the pivot body) and rotate about the same axis of rotation as the second portion (e.g., as the pivot body).

In the first portion of the structural component, the one or more coils may be mounted on a first side of a frame or main body of the first portion and be wound about an axis which is parallel to an axis of rotation of the scan element as well as an axis of rotation of the second portion. For example, when a current is applied to the one or more coils, the flux direction is parallel to the axis of rotation of the scan element and the axis of rotation of the second portion. The magnetic field generated by the one or more coils interacts with the magnetic field of the one or more magnets, and a force (a torque) is exerted on the one or more magnets.

The first plurality of flexure components are configured to oscillate in response to the torque that is applied to the second portion including the one or more magnets. That is, the first plurality of flexure components are formed of a material that can be excited at its fundamental (resonant) frequency. An example configuration of the first plurality of flexure components may be as follows. For example, the first plurality of flexure components may include a plurality of leaf-type isosceles-trapezoidal flexure components. The flexure components may be disposed in parallel which can allow for extremely large deflections without high stresses to occur, enabling scanned fields of view larger than 100 degrees to be achieved. Additionally, the flexure components are resistant to movement or deformation in an out of plane motion, thereby maintaining the structural stability of the scanner and reducing unwanted vibrations. Each flexure component may include a plurality of spring components that are disposed between and coupled to the pivot body and an outer rigid body. For example, each spring component may be disposed in a groove provided in the outer rigid body and/or the pivot body. For example, the spring component may be welded to the outer rigid body and/or the pivot body. The plurality of spring components may be spaced apart in a circumferential direction of the second portion. The plurality of spring components may be thin flat metal plates formed of steel, for example, stainless steel (e.g., precipitation stainless steel), and may include one or more interstitial additives (e.g., copper, aluminum, etc.) that enhance the durability and/or strength of the spring component. For example, the outer rigid body and the pivot body may be formed of stainless steel (e.g., 410 stainless steel having a magnetic martensitic structure). The first plurality of flexure components may include a first flexure component having a first set of spring components and a second set of spring components that are spaced apart from each other in a circumferential direction of the second portion and which are commonly coupled to a first outer rigid body and the pivot body. The first plurality of flexure components may further include a second flexure component having a third set of spring components and a fourth set of spring components that are spaced apart from each other in a circumferential direction of the second portion and which are commonly coupled to a second outer rigid body and the pivot body. The first flexure component and the second flexure component may be diametrically opposed to each other with respect to the pivot body.

The second plurality of flexure components are also configured to oscillate in response to the torque that is applied to the second portion including the one or more magnets. That is, the second plurality of flexure components are formed of a material that is excited at its fundamental (resonant) frequency. An example configuration of the second plurality of flexure components may be as follows. For example, the second plurality of flexure components may be formed of the same materials as the first plurality of flexure components. Each flexure component of the second plurality of flexure components may include a plurality of spring components that are disposed between and coupled to the pivot body and an outer rigid body which is disposed on the first portion. For example, each spring component may be disposed in a groove provided in the outer rigid body and/or the pivot body. For example, the spring component may be welded to the outer rigid body and/or the pivot body. The plurality of spring components may be spaced apart in a circumferential direction of the second portion. The plurality of spring components may be thin flat metal plates formed of steel, for example, stainless steel (e.g., precipitation stainless steel), and may include one or more interstitial additives (e.g., copper, aluminum, etc.) that enhance the durability and/or strength of the spring component. For example, the outer rigid body of the first portion and the pivot body may be formed of stainless steel (e.g., 410 stainless steel having a magnetic martensitic structure). The second plurality of flexure components may include a first flexure component having a first set of spring components that are spaced apart from each other in a circumferential direction of the second portion and which are commonly coupled to a first outer rigid body and the pivot body. The second plurality of flexure components may further include a second flexure component having a second set of spring components that are spaced apart from each other in a circumferential direction of the second portion and which are commonly coupled to a second outer rigid body and the pivot body. The first flexure component and the second flexure component of the second plurality of flexure components may be disposed on a first side of the first portion between the first flexure component and the second flexure component of the first plurality of flexure components.

The second plurality of flexure components may include a third flexure component having a third set of spring components that are spaced apart from each other in a circumferential direction of the second portion and which are commonly coupled to a third outer rigid body and the pivot body. The second plurality of flexure components may further include a fourth flexure component having a fourth set of spring components that are spaced apart from each other in a circumferential direction of the second portion and which are commonly coupled to a fourth outer rigid body and the pivot body. The third flexure component and the fourth flexure component of the second plurality of flexure components may be disposed on a second side of the first portion between the first flexure component and the second flexure component of the first plurality of flexure components, symmetrically opposite to the first flexure component and the second flexure component of the second plurality of flexure components.

To achieve a compact resonant structure, in some implementations, various components may be disposed within a radial length of a flexure component. For example, each of the second plurality of flexure components can have a radial length which extends in a radial direction of the second portion from the pivot body to an outer rigid body of the first portion. The one or more coils and/or the one or more magnets may be disposed in a space within the radial length of the second plurality of flexure components. For example, the one or more coils may be disposed (on the first portion) between a first flexure component and a second flexure component among the plurality of second flexure components in the circumferential direction of the second portion. For example, the one or more magnets may be disposed (on the second portion) between the first flexure component and the second flexure component among the plurality of second flexure components in the circumferential direction of the second portion. The one or more coils may be spaced apart from the one or more magnets in a direction parallel to an axis of rotation of the second portion.

In some implementations, the first portion can further include an encoder (e.g., a quadrature encoder) configured to measure at least one of a position of the second portion and a direction of movement of the second portion. The encoder may be disposed between adjacent flexure components among the second plurality of flexure components (e.g., in a space within the radial length of the second plurality of flexure components). For example, the encoder may be disposed on an opposite side of the first portion than the one or more coils.

In some implementations, the first portion can further include a controller (e.g., a microcontroller) configured to control a supply of power or current to drive the one or more coils. For example, the one or more controllers may be configured to control one or more power sources of the LIDAR system to supply power to the one or more coils to drive the one or more coils which causes the force (torque) to be exerted on the one or more magnets, thereby causing the first plurality of flexure components and the second plurality of flexure components to oscillate. Based on information provided by the encoder, the controller can be configured to control the power (e.g., the current) supplied to the one or more coils to ensure a phase lock between frequencies of the one or more coils and the rotation of the second portion so that the second portion (and correspondingly the scan element) rotates at the resonate frequency of the first plurality of flexure components. According to examples of the disclosure, the quality factor (the Q-factor which quantifies how sharply a resonant system oscillates at its natural frequency) associated with the rotation of the second portion (and correspondingly the scan element), may be at least 100. In some implementations, the controller can be disposed between adjacent flexure components among the second plurality of flexure components (e.g., in a space within the radial length of the second plurality of flexure components). For example, the controller may be disposed on a same side of the first portions as the encoder and on an opposite side of the first portion than the one or more coils.

In some implementations, the LIDAR system may include a driving circuit which is configured to provide a driving signal to the one or more coils. For example, the driving circuit may include a H-bridge circuit that is configured to repeatedly reverse a polarity of the voltage or reverse a direction of the current applied to the one or more coils, thereby exerting a force (torque) in alternating directions with respect to the one or more magnets.

The scan element may be configured to rotate via rotation of the second portion and to direct the light emitted by the light source to an environment of the vehicle. The scan element can include a mirror which is adjustable to enable a variable field of view, where the field of view can be adjusted according to a magnitude of a supply of current supplied to drive the one or more coils. In some implementations, the variable field of view of the LIDAR system can range from between 0 degrees and 150 degrees. In some implementations, the mirror has a reflective surface area of between five square inches and ten square inches.

A second example of the disclosure is directed to a LIDAR system including a second resonant scanner configured to direct light emitted from a light source of a LIDAR engine to an environment of a vehicle. The second resonant scanner may include a structural component and a scan element (mirror) mounted to the structural component. The structural component may include a stator portion (first portion) and a rotor portion (second portion).

In this second example, the first portion can include one or more coils (e.g., voice coils, air coils, drive coils, etc.), an encoder (e.g., a quadrature encoder), one or more controllers (e.g., microcontrollers), and one or more drive circuits (e.g., H-bridge circuits). The second portion can include a first plurality of flexure components (a first flexure stage) and one or more magnets (permanent magnets) which are disposed to face the one or more coils. The structural component can further include a second plurality of flexure components (a second flexure stage) which is coupled to the first portion (e.g., a rigid body disposed on the first portion) and the second portion (e.g., a pivot body having an axis of rotation about which the second portion rotates). The scan element (e.g., a mirror) may be mounted to the second portion (e.g., the pivot body) and rotate about the same axis of rotation as the second portion (e.g., as the pivot body).

Different from the first example of the resonant scanner, in the second example in the first portion of the structural component, the one or more coils may be mounted on a first side of a frame or main body of the first portion and be wound about an axis which extends in a radial direction relative to an axis of rotation of the scan element as well as an axis of rotation of the second portion. For example, when a current is applied to the one or more coils, the flux direction extends in a radial direction relative to the axis of rotation of the scan element and the axis of rotation of the second portion. The magnetic field generated by the one or more coils interacts with the magnetic field of the one or more magnets, and a force (a torque) is exerted on the one or more magnets. Further, the one or more coils may be disposed beyond or outside of a radial length of the flexure components.

Different from the first example of the resonant scanner, in the second example the one or more magnets may be disposed on a side of an outer rigid body of a flexure component among the first plurality of flexure components which faces the one or more coils. In addition, in some implementations the encoder, driver circuit (H-bridge circuit), and the controller may be disposed at different locations than the encoder, driver circuit (H-bridge circuit), and controller of the first embodiment of the resonant scanner.

Other features and operations of the components of the second example of the resonant scanner may be similar to the first example of the resonant scanner.

Examples of the disclosure are also directed to a drive control system for a scanner of a LIDAR system. For example, the one or more controllers may form part of a drive control system and may be configured to provide one or more control signals to one or more power sources and/or the drive circuit to drive the one or more coils. When the one or more coils are driven (e.g., when a current is applied to the one or more coils), the magnetic field generated by the one or more coils interacts with the magnetic field of the one or more magnets, and a force (e.g., a torque) is exerted on the one or more magnets which are disposed at the second portion of the structural component. Further, the first plurality of flexure components and the second plurality of flexure components are configured to oscillate in response to the torque that is applied to the second portion including the one or more magnets. For example, the first plurality of flexure components and the second plurality of flexure components may be formed of a material that can be excited at its fundamental (resonant) frequency. Each flexure component may include a plurality of spring elements that are disposed between and coupled to the pivot body and an outer rigid body. The plurality of spring components may be thin flat metal plates formed of steel, for example, stainless steel (e.g., precipitation stainless steel), and may include one or more interstitial additives (e.g., copper, aluminum, etc.) that enhance the durability and/or strength of the spring component. When the torque is exerted on the one or more magnets and the first plurality of flexure components and the second plurality of flexure components oscillate, the second portion rotates, which also causes the scan element to correspondingly rotate.

The resonant scanner can further include an encoder which monitors or measures at least one of position information or direction information with respect to the second portion. For example, the encoder can include one or more encoder readers (one or more detectors or sensors such as an optical sensor) which detect markings that are provided on a part (e.g., an encoder strip such as a reflective adhesive strip) disposed on the second portion. In some implementations, the encoder is configured to determine the position information based on a number of pulses or square waves generated and/or by counting transitions in reflected light intensity from the reflective adhesive strip. In some implementations, the encoder may include a quadrature encoder having a plurality of encoder readers (detectors or sensors such as optical sensors) which output two signals (corresponding to an "A" channel and a "B" channel), such as square waves. For example, the A channel and B channel may be 90 degrees out of phase. The encoder may be configured to determine a direction of rotation of the second portion based on an alternating pattern of the A channel and B channel. Further, in some implementations the encoder can include an index track (corresponding to a "C" channel). The index track can be implemented to indicate a direction of rotation via an absolute state change (e.g., a 2-bit state change), and provide a reference point for absolute position information. The encoder may be configured to output a first signal indicating at least one of position information or direction information associated with the rotation of the second portion when the one or more coils are driven.

The LIDAR system may include one or more power sources to supply power to the one or more coils via a drive circuit. In some implementations, the one or one or more controllers are configured to control the one or more power sources to supply the power to drive the one or more coils (via the drive circuit), based on the first signal output by the encoder and a second signal associated with driving the one or more coils. The supply of power can be controlled by switching and/or regulating voltage and/or current to control at least one of timing, direction, and magnitude of the voltage and/or current applied to the one or more coils. In some implementations, the drive circuit may be embodied as one or more transistors, a half-bridge circuit, or a H-bridge circuit. The H-bridge circuit allows full bidirectional control of current through the one or more coils (e.g., in a first rotational direction and a second rotational direction). The H-bridge circuit can include a snubber circuit (e.g., a triple snubber filter) to dampen voltage transients, suppress ringing or oscillations, improve switching performance, etc.

The drive circuit can be configured to supply voltage to cause displacement of the scan element of over 90 degrees (e.g., between about 90 degrees and about 150 degrees), the supplied voltage being about 10 volts, or more particularly about 7 volts. The drive circuit can be configured to supply power to cause displacement of the scan element of over 90 degrees (e.g., between about 90 degrees and about 150 degrees), the supplied power being less than 10 watts, or more particularly less than 5 watts. In some implementations, the one or more controllers may be configured to control the one or more power sources to vary the power (e.g., current and/or voltage) supplied to drive the one or more coils via the drive circuit to vary a field of view of the scan element between about 0 degrees and about 150 degrees.

In some implementations, the one or more controllers are configured to control the drive circuit (e.g., an H-bridge circuit) to output the second signal associated with driving the one or more coils, and the second signal includes two opposite-phase square wave signals to alternate a direction of current applied to the one or more coils. In some implementations, the one or more controllers are configured to control the drive circuit to output the second signal associated with driving the one or more coils, and the second signal includes a sine wave signal having a first frequency which is generated using pulse-width modulation having a second frequency.

According to examples of the disclosure, the first signal output by the encoder represents or is indicative of the movement (rotation) of the second portion which is coupled with the scan element. That is, the first signal output by the encoder can be used by the one or more controllers to reconstruct a waveform that corresponds to how the second portion rotates (e.g., a direction of rotation, position information, speed information, etc.). The one or more controllers may be configured to compare a phase of the first signal and/or reconstructed waveform relative to a phase of a second signal which drives the one or more coils and the one or more controllers may be configured to adjust an input provided to drive the one or more coils based on the first signal output by the encoder (or the reconstructed waveform) and the second signal associated with driving the one or more coils so that the second portion (and correspondingly the scan element), oscillates at the resonant frequency of the plurality of flexure components. For example, the one or more controllers may be configured to adjust an input which can include a phase difference between the first signal or reconstructed waveform and the second signal. For example, the one or more controllers may be configured to provide a control input to drive the one or more coils such that the first signal (or reconstructed waveform) is out of phase with the second signal by 90 degrees, so that the second portion (and correspondingly the scan element), oscillates at the resonant frequency of the plurality of flexure components.

In some implementations, the one or more controllers are configured to adjust one or more other inputs (e.g., a frequency associated with the second signal, an amount of power associated with the second signal, etc.), based on the first signal (or the reconstructed waveform) and the second signal associated with driving the one or more coils. For example, the one or more controllers may be configured to, based on differences between the first signal output by the encoder and the second signal associated with driving the one or more coils, adjust the amount of power so that pulses associated with the first signal are centered with a natural oscillation frequency associated with the plurality of flexure components.

Example aspects of the disclosure are directed to LIDAR systems for autonomous vehicles. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

An autonomous vehicle (AV) can include a LIDAR system to assist the AV in perceiving its environment and navigating its environment. The LIDAR system can include a transceiver having a transmitter and receiver. The transmitter can condition a light beam (e.g., a laser beam) to be emitted by the LIDAR system into its environment. Similarly, the receiver can provide for receiving the light beam after it is emitted into the environment of the LIDAR system and reflected by objects in the environment. The receiver can provide the received beam to downstream components of the LIDAR system for processing, which can provide for the AV to perceive its environment. Because of the correlation between the transmitted beam and received beam, the transmitter and receiver may generally be placed in a tightly controlled positional relationship. For instance, the portion of the transmitter that emits the beam can be positioned near the portion of the receiver that receives the beam. In addition, some LIDAR systems such as coherent LIDAR systems can utilize a reference signal, such as a local oscillator (LO) signal, which passes from the transmitter to receiver without being emitted into the environment of the LIDAR system. For instance, this reference signal may be combined with the received beam to denoise or otherwise process the received beam to extract useful information. For instance, the LIDAR system can determine a distance to the object and/or velocity of the object based on the reflected beam.

The disclosure provides an improved LIDAR system, such as a coherent LIDAR system, which includes components such as scanners which are durable, have an increased field of view, and are compact in size.

A scanner for a LIDAR system according to the disclosure can provide numerous technical effects and benefits. For example, the disclosed resonant scanners for the LIDAR systems described herein do not include wearing parts and thus are highly durable and reliable and have a long life cycle. The disclosed resonant scanners described herein can also have a compact size, with various components disposed in an inner space between flexure components. Further, according to the resonant scanners described herein a size of the scan element can be larger compared to scan elements of existing LIDAR systems. For example, according to the configurations of the resonant scanner described herein, the deflection of the scan element is not limited by obstructions such as a static structure, and can be deflected to the extent that the physical structure of flexure components allows (e.g., based on material endurance and stress characteristics).

The disclosed driving controls for a resonant scanner of a LIDAR system described herein are capable of varying a field-of-view of a scan element on-the-fly and consume low amounts of power (e.g., less than 5 watts). Further, the disclosed driving controls can ensure that the scan element oscillates at the resonant frequency of the flexure components based on information output by the encoder and potentially other feedback control loop mechanisms.

Example aspects of the disclosure provide an example light detection and ranging (LIDAR) system for a vehicle. The example LIDAR system includes: a light source configured to emit light; and a scanner including: a fixed first portion including one or more coils, a rotatable second portion including one or more magnets and a first plurality of flexure components configured to oscillate in response to the one or more coils being driven, a scan element configured to rotate via rotation of the rotatable second portion and to direct the light emitted by the light source to an environment of the vehicle, an encoder configured to output one or more first signals indicating at least one of position information or direction information associated with rotation of the rotatable second portion when the one or more coils are driven, and one or more controllers configured to provide an input associated with driving the one or more coils and to adjust the input based on the one or more first signals output by the encoder and a second signal associated with the input.

In some implementations, the LIDAR system further includes one or more power sources; and wherein the one or more controllers are configured to control the one or more power sources to supply power to drive the one or more coils, based on the one or more first signals output by the encoder and the second signal associated with the input.

In some implementations, the one or more controllers are configured to control the one or more power sources to supply the power to drive the one or more coils to cause displacement of the scan element between about 90 degrees and about 150 degrees.

In some implementations, the one or more controllers are configured to control the one or more power sources to vary the power supplied to drive the one or more coils to vary a field of view of the scan element between about 0 degrees and about 150 degrees.

In some implementations, the input includes a frequency, and the one or more controllers are configured to adjust the frequency based on the one or more first signals output by the encoder and the second signal associated with the input.

In some implementations, the input includes an amount of power, and the one or more controllers are configured to adjust the amount of power based on the one or more first signals output by the encoder and the second signal associated with the input.

In some implementations, the amount of power is less than ten watts.

In some implementations, the input includes an amount of power, and the one or more controllers are configured to, based on differences between the one or more first signals output by the encoder and the second signal associated with the input, adjust the amount of power so that pulses associated with the second signal are centered on a natural oscillation frequency associated with the first plurality of flexure components.

In some implementations, the second signal includes two opposite-phase square wave signals to alternate a direction of current applied to the one or more coils.

In some implementations, the LIDAR system further includes a drive circuit configured to output the second signal, and wherein the drive circuit includes a H-bridge circuit.

In some implementations, the second signal includes a sine wave signal having a first frequency which is generated using pulse-width modulation associated with a second frequency.

In some implementations, the encoder includes a quadrature encoder configured to output the one or more first signals indicating the position information and the direction information associated with the rotation of the rotatable second portion.

In some implementations, the LIDAR system further includes a drive circuit configured to output the second signal associated with the input, wherein the scanner further includes a second plurality of flexure components coupled to the fixed first portion and the rotatable second portion, and the first plurality of flexure components and the second plurality of flexure components are configured to oscillate in response to a force exerted on the one or more magnets when the one or more controllers control the drive circuit to drive the one or more coils, thereby causing the rotatable second portion to rotate.

Example aspects of the disclosure provide an example method for controlling rotation of a scan element of a scanner for a light detection and ranging (LIDAR) system for a vehicle. The example method includes: providing, by one or more controllers of the scanner, an input associated with driving one or more coils disposed on a fixed first portion of the scanner, to cause a first plurality of flexure components disposed on a rotatable second portion of the scanner to oscillate and the scan element coupled to the rotatable second portion to rotate; outputting, by an encoder of the scanner, one or more first signals indicating at least one of position information or direction information associated with rotation of the rotatable second portion; and adjusting, by the one or more controllers, the input based on the one or more first signals output by the encoder and a second signal associated with the input.

In some implementations, the method includes controlling, by the one or more controllers, one or more power sources to supply power to drive the one or more coils, based on the one or more first signals output by the encoder and the second signal associated with the input.

In some implementations, the input includes a frequency, and the method further includes: adjusting, by the one or more controllers, the frequency based on the one or more first signals output by the encoder and the second signal associated with the input.

In some implementations, the input includes an amount of power, and the method further includes: adjusting, by the one or more controllers, the amount of power based on the one or more first signals output by the encoder and the second signal associated with the input.

In some implementations, the input includes an amount of power, and the method further includes: adjusting, by the one or more controllers, the amount of power based on differences between the one or more first signals output by the encoder and the second signal associated with the input, adjust the amount of power so that pulses associated with the second signal are centered on a natural oscillation frequency associated with the first plurality of flexure components.

In some implementations, the second signal includes two opposite-phase square wave signals to alternate a direction of current applied to the one or more coils, or the second signal includes a sine wave signal having a first frequency which is generated using pulse-width modulation associated with a second frequency.

Example aspects of the disclosure provide an example autonomous vehicle (AV) control system for a vehicle. The example AV control system for the vehicle includes one or more processors and a Light Detection and Ranging (LIDAR) system including: a light source configured to emit a beam to be directed toward an object in an environment of the autonomous vehicle; and a scanner including: a fixed first portion including one or more coils, a rotatable second portion including one or more magnets and a first plurality of flexure components configured to oscillate in response to the one or more coils being driven, a scan element configured to rotate via rotation of the rotatable second portion and to direct the light emitted by the light source to an environment of the vehicle, an encoder configured to output one or more first signals indicating at least one of position information or direction information associated with rotation of the rotatable second portion when the one or more coils are driven, and one or more controllers configured to provide an input associated with driving the one or more coils and to adjust the input based on the one or more first signals output by the encoder and a second signal associated with the input.

Example aspects of the disclosure provide an example autonomous vehicle (AV). The example AV includes an autonomous vehicle control system, the autonomous vehicle control system including a Light Detection and Ranging (LIDAR) system, the LIDAR system including: a light source configured to emit a beam to be directed toward an object in an environment of the autonomous vehicle; and a scanner including: a fixed first portion including one or more coils, a rotatable second portion including one or more magnets and a first plurality of flexure components configured to oscillate in response to the one or more coils being driven, a scan element configured to rotate via rotation of the rotatable second portion and to direct the light emitted by the light source to an environment of the vehicle, an encoder configured to output one or more first signals indicating at least one of position information or direction information associated with rotation of the rotatable second portion when the one or more coils are driven, and one or more controllers configured to provide an input associated with driving the one or more coils and to adjust the input based on the one or more first signals output by the encoder and a second signal associated with the input.

Other example aspects of the disclosure are directed to other systems, methods, vehicles, apparatuses, tangible non-transitory computer-readable media, and devices for motion prediction and/or operation of a device including a LIDAR system having a LIDAR module according to example aspects of the disclosure.

These and other features, aspects and advantages of various implementations of the disclosure will become better understood with reference to the following description and appended claims. The accompanying drawings, which are incorporated in and constitute a part of this specification, illustrate implementations of the disclosure and, together with the description, serve to explain the related principles.

DETAILED DESCRIPTION

The following describes the technology of this disclosure within the context of a LIDAR system and an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
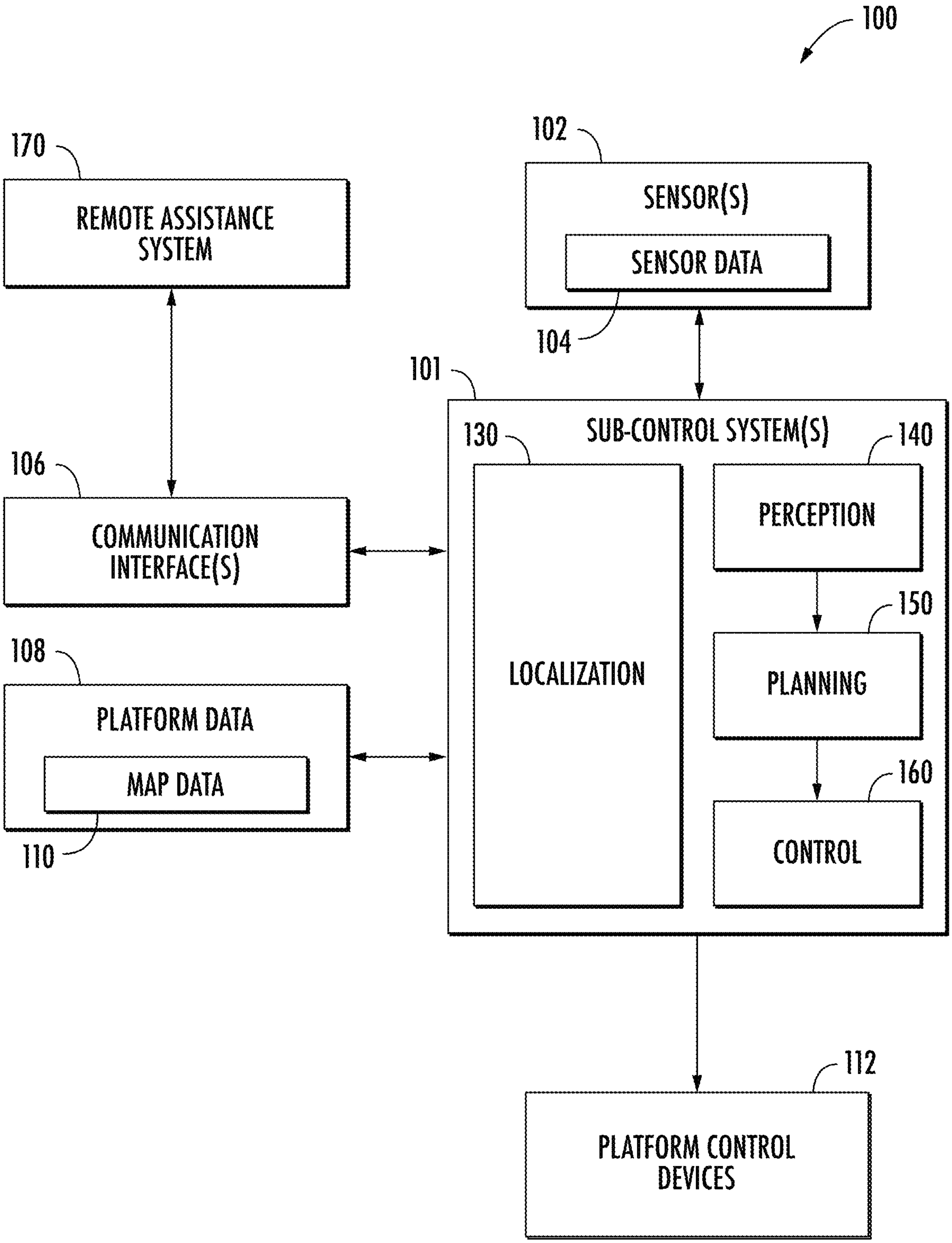
FIG. 1 depicts a block diagram of an example system, according to some implementations of the disclosure.

With reference to FIGS. 1-8, example implementations of the disclosure are discussed in further detail. FIG. 1 depicts a block diagram of an example autonomous vehicle control system 100 for an autonomous vehicle. The autonomous vehicle control system 100 can be implemented by a computing system of an autonomous vehicle. The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally, or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with particular component(s) or system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally, or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine the current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment.

Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within the surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 101 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally, or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select the highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally, or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning system 150. Additionally, or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
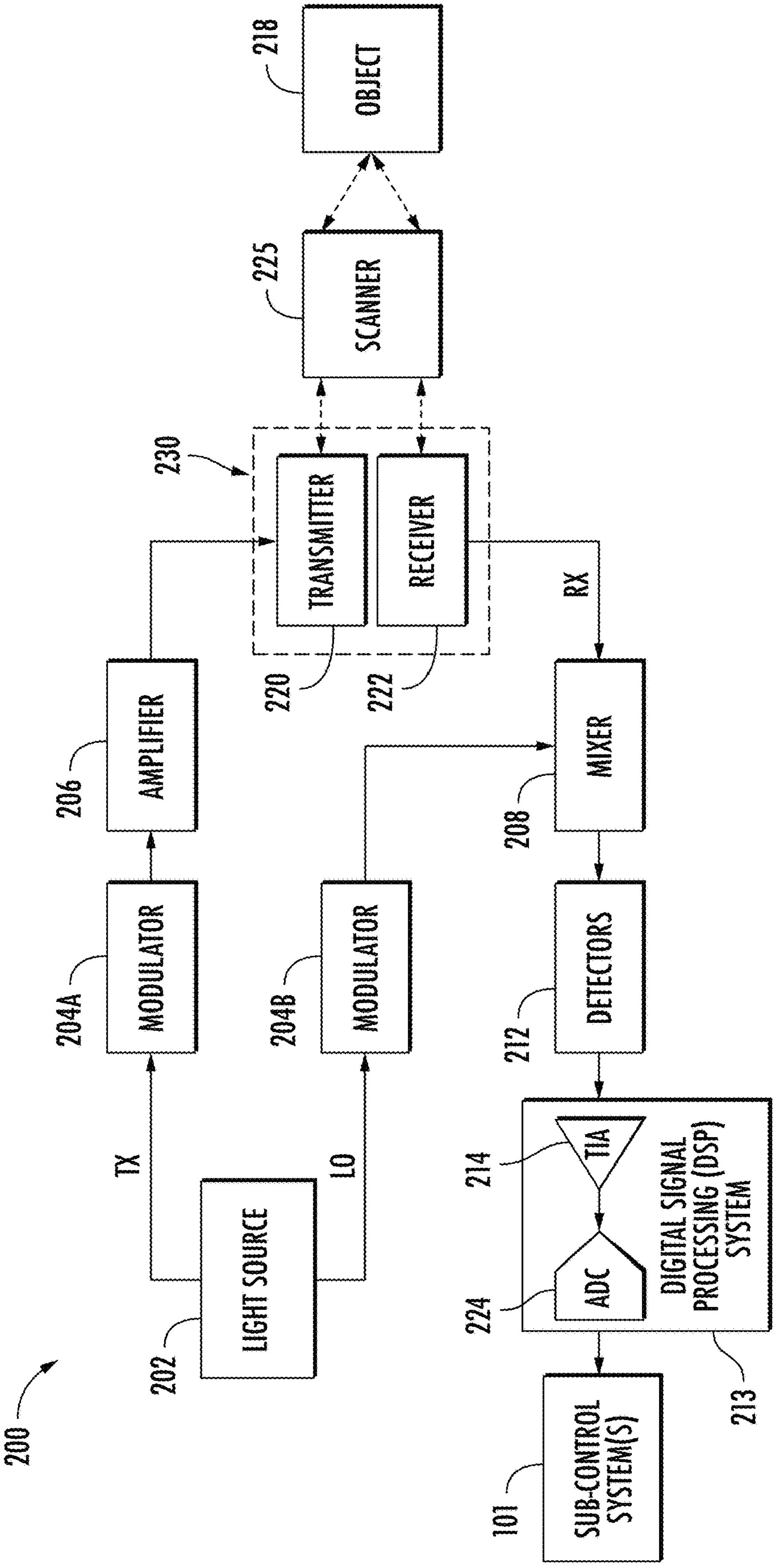
FIG. 2 depicts a block diagram of an example LIDAR system, according to some implementations of the disclosure.

FIG. 2 is a block diagram illustrating an example LIDAR system 200 for vehicles (e.g., autonomous vehicles). The environment includes a LIDAR system 200 that includes a transmit (TX) path and a receive (RX) path. The TX path includes one or more TX input/output ports (e.g., channels), and the RX path includes one or more RX input/output ports (e.g., channels). In some implementations, a semiconductor substrate and/or semiconductor package may include the TX path and/or the RX path. In some implementations, the semiconductor substrate and/or semiconductor package may include at least one of silicon photonics circuitry, programmable logic controller (PLC), or group III-V semiconductor circuitry.

In some implementations, a first semiconductor substrate and/or a first semiconductor package may include the TX path and a second semiconductor substrate and/or a second semiconductor package may include the RX path. In some arrangements, the RX input/output ports and/or the TX input/output ports may occur (or be formed/disposed/located/placed) along one or more edges of one or more semiconductor substrates and/or semiconductor packages.

The LIDAR system 200 can be coupled to one or more sub-control system(s) 101 (e.g., the sub-control system(s) 101 of FIG. 1). In some implementations, the sub-control system(s) 101 may be coupled to the RX path via the one or more RX input/output ports. For instance, the sub-control system(s) 101 can receive LIDAR outputs from the LIDAR system 200. The sub-control system(s) 101 can control a vehicle (e.g., an autonomous vehicle) based on the LIDAR outputs.

The TX path may include a light source (e.g., laser source) 202, a modulator 204A, a modulator 204B, an amplifier 206, one or more transmitters 220, and scanner 225. The RX path may include scanner 225, one or more receivers 222, a mixer 208, a detector 212, a digital signal processing (DSP) system 213, a transimpedance amplifier (TIA) 214, and one or more analog-to-digital converters (ADCs) 224. In some examples, the components of LIDAR system 200 can function together to encode an optical signal and scatter the encoded optical signal into free-space using optics. By detecting the signal differences (e.g., frequency or phase differences) between the encoded optical signal transmitted by the TX path and a returned signal reflected back from an object and received at RX path, the LIDAR system 200 can determine the location of the object (including range/distance from the LIDAR system 200 to object 218) and/or precisely measure the velocity of the object 218 using the Doppler effect.

Although FIG. 2 shows only a select number of components and only one input/output channel, the LIDAR system 200 may include any number of components and/or input/output channels (in any combination) that are interconnected in any arrangement to facilitate combining multiple functions of a LIDAR system, to support the operation of a vehicle.

The light source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1440 nanometers. In some implementations, the light signal may have an operating wavelength of between 950 nanometers and 1550 nanometers.

The light source 202 may be configured to provide the light signal to the modulator 204A, which is configured to modulate a phase and/or a frequency of the light signal based on a first radio frequency (RF) signal (e.g., an "RF1" signal) to generate a modulated and optionally encoded light signal, such as by Continuous Wave (CW) modulation or quasi-CW modulation. As such, LIDAR system 200 can be a frequency modulated (FM) LIDAR system or a phase modulated (PM) LIDAR system. In some implementations, when an FM LIDAR system 200 may use a continuous wave it is referred to as "FMCW LIDAR," and when an FM LIDAR system 200 uses a quasi-continuous wave it is referred to as "FMQW LIDAR".

The modulator 204A may be configured to send the modulated light signal to the amplifier 206. The amplifier 206 may be configured to amplify the modulated light signal to generate an amplified light signal for transmission via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz).

The LIDAR system 200 includes one or more transmitters 220 and one or more receivers 222. The transmitter(s) 220 and/or receiver(s) 222 can be included in a transceiver 230. The transmitter(s) 220 can provide the transmit beam that it receives from the TX path into an environment within a given field of view toward an object 218. The one or more receivers 222 can receive a received beam reflected from the object 218 and provide the received beam to the mixer 208 of the RX path. The one or more receivers 222 may include one or more optical waveguides or antennas. In some arrangements, the one or more transceivers 230 may include a monostatic transceiver or a bistatic transceiver.

In some examples, transceiver 230 can include optics configured to receive a TX optical waveform, which is input to the scanner 225 as a TX signal. The TX signal may be transmitted through the scanner 225 to illuminate an object 218 (or an area of interest). The scanner 225 may receive a return optical signal reflected by the object 218 as a receive (RX) optical signal. In some implementations, scanner 225 may be a resonant scanner such as scanner 3000 of FIGS. 3A-3D or scanner 4000 of FIGS. 4A-4C. Scanner 225 may include one or more scanning optics, such as one or more polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light. In some implementations, the mixer 208 may mix the RX signal with the LO signal to produce an optical signal, which may be then detected by the detector 212 and further delivered to the digital sampling system of the DSP system 213 as analog data input.

The light source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the RX path. The mixer 208 may be configured to mix (e.g., combine, multiply, etc.) the modulated LO signal with the returned signal to generate a down-converted signal and send the down-converted signal to the detector 212.

In some arrangements, the mixer 208 may be configured to send the modulated LO signal to the detector 212. The detector 212 may be configured to generate an electrical signal based on the down-converted signal and send the electrical signal to the DSP system 213, which may include at least TIA 214 and one or more digitizers such as ADCs 224. In some examples, the ADCs 224 may be part of a digital sampling system that includes additional components such as but not limited to a digital mixer (e.g., a direct digital synthesizer (DDS), digital multipliers), one or more filters (e.g., a low pass filter), and a down-sampler. In some implementations, DSP system 213 may include circuits or one or more processors configured to perform demodulation, decoding, and related tasks. These circuits may be generally based on application-specific ICs (ASICs), field-programmable gate arrays (FPGAs) and programmable DSP devices.

In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224 and/or other components of DSP system 213. In some implementations, the TIA 214 may have a peak noise-equivalent power (NEP) that is less than 5 picowatts per square root Hertz (i.e., 5×10-12 Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz).

The sub-control system(s) 101 may be configured to determine a distance to the object 218 and/or measure the velocity of the object 218 based on the one or more electrical signals that it receives from the TIA 214 via the one or more ADCs 224.

Figure 3A:
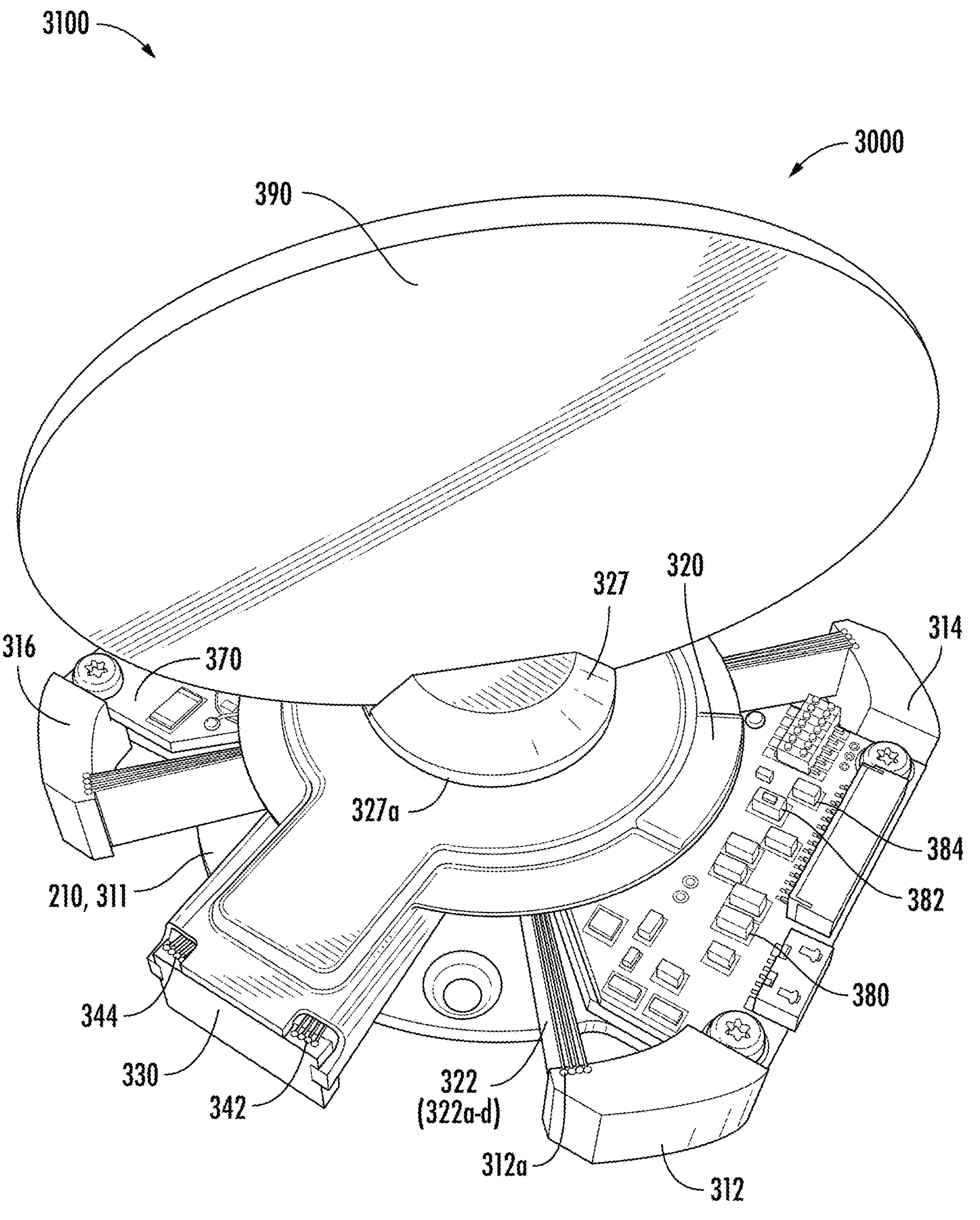
FIGS. 3A-3D depict an example scanner system for a LIDAR system, according to some implementations of the disclosure.
Figure 3B:
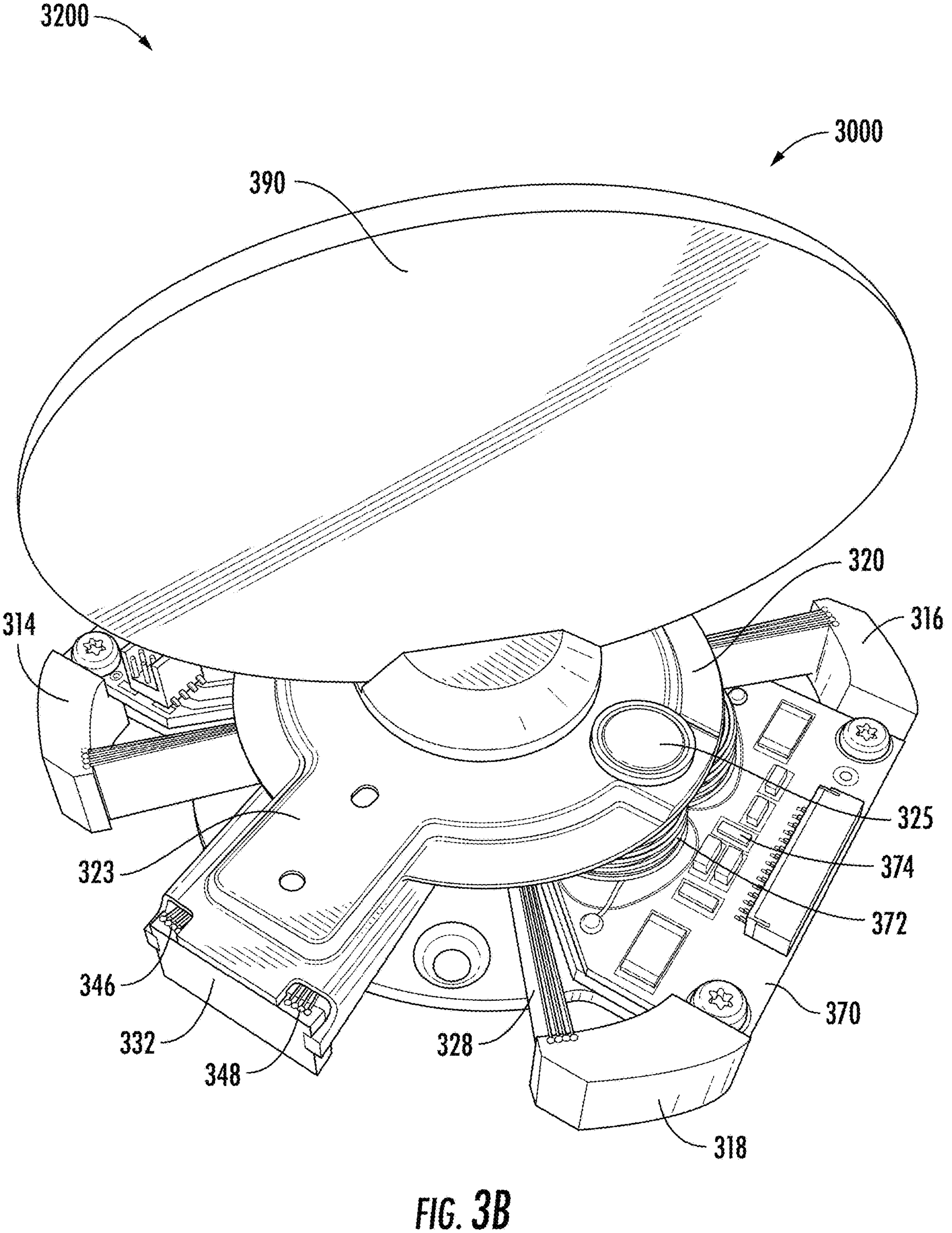
Figure 3C:
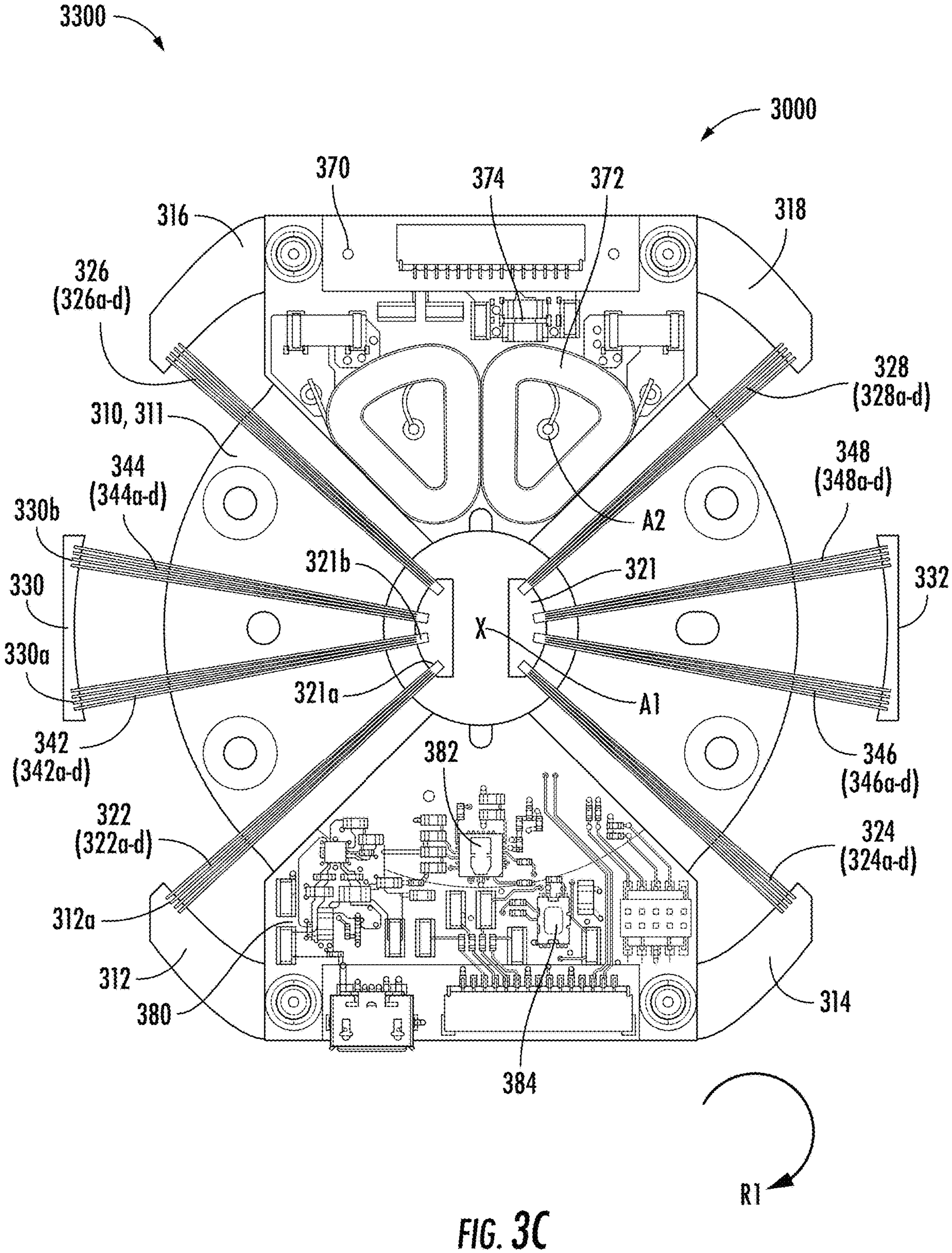
Figure 3D:
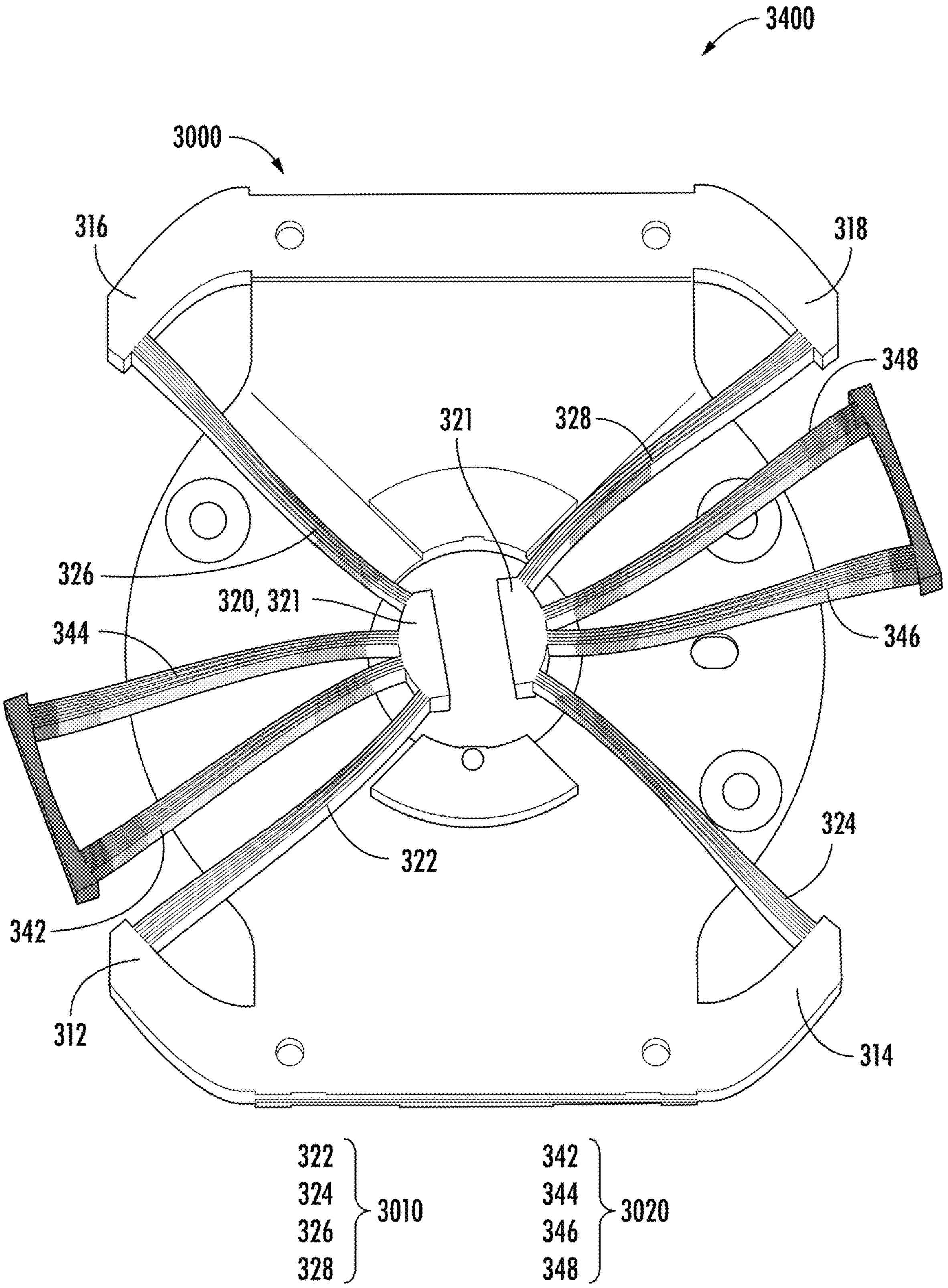

FIGS. 3A-3D depict example aspects of a scanner 3000 for a LIDAR system. FIG. 3A depicts a front perspective view (first view 3100) of the scanner 3000, FIG. 3B depicts a rear perspective view (second view 3200) of the scanner 3000, FIG. 3C depicts an overhead view (third view 3300) of the scanner 3000, and FIG. 3D depicts a view of the flexure stages of the scanner 3000 deflecting while the coils of the scanner 3000 are driven. Referring to FIG. 3A, the first view 3100 shows a front perspective view of the scanner 3000 including a structure (e.g., metal structure) having a fixed base 310 (a first portion), a rotatable base 320 (a second portion), and a scan element 390. The scanner 3000 may be implemented in various LIDAR systems, including a time-of-flight (ToF) LIDAR system.

As depicted in FIGS. 3A-3C, the fixed base 310 can include a bottom base 311 (lower base), a plurality of first protruding portions which protrude outward from a first section of the bottom base 311, and a plurality of second protruding portions which protrude outward from a second section of the bottom base 311. For example, the plurality of first protruding portions can include a first protruding portion 312 and a second protruding portion 314. For example, the plurality of second protruding portions can include a third protruding portion 316 and a fourth protruding portion 318. Each of the first protruding portions and the second protruding portions can include grooves disposed in an inner circumferential surface facing the rotatable base 320. As will be described in further detail, flexure components of a first flexure stage of the scanner 3000 are coupled to respective grooves provided in each of the first protruding portions and the second protruding portions. For example, referring to the first protruding portion 312, grooves 312*a* are disposed on an inner surface of the first protruding portion 312 which faces the rotatable base 320.

Referring to the third view 3300 of FIG. 3C, a first flexure stage of the scanner 3000 includes a first flexure component 322 having a first plurality of spring components (e.g., a first spring component 322*a*, a second spring component 322*b*, a third spring component 322*c*, and a fourth spring component 322*d*), a second flexure component 324 having a second plurality of spring components (e.g., a first spring component 324*a*, a second spring component 324*b*, a third spring component 324*c*, and a fourth spring component 324*d*), a third flexure component 326 having a third plurality of spring components (e.g., a first spring component 326*a*, a second spring component 326*b*, a third spring component 326*c*, and a fourth spring component 326*d*), and a fourth flexure component 328 having a fourth plurality of spring components (e.g., a first spring component 328*a*, a second spring component 328*b*, a third spring component 328*c*, and a fourth spring component 328*d*). In some implementations, the spring components of the first flexure stage may include a leaf-spring.

Each of the first plurality of spring components of the first flexure component 322 has a first end disposed in and coupled to respective grooves 312*a* of the first protruding portion 312 and a second end disposed in and coupled to respective grooves 321*a* of a rotatable pivot body 321. In some implementations, the rotatable pivot body 321 is a floating component that is attached or coupled to the first and second flexure stages, and is not directly connected to the rotatable base 320 or the fixed base 310. In some implementations, the first end of a spring component is welded to the first protruding portion 312. However, the disclosure is not limited to this implementation and the first end of the spring component may be secured to the first protruding portion 312 via other additional and/or alternative methods (e.g., adhesives, fixing components, etc.). In some implementations, the second end of the spring component is welded to the rotatable pivot body 321. However, the disclosure is not limited to this implementation and the second end of the spring component may be secured to the rotatable pivot body 321 via other additional and/or alternative methods (e.g., adhesives, fixing components, etc.).

As shown in FIG. 3C, the second flexure component 324, third flexure component 326, and fourth flexure component 328 have a similar configuration as the first flexure component 322 and therefore a repeated description thereof will be omitted for the sake of brevity.

The first section of the bottom base 311 is disposed between the first protruding portion 312 and the second protruding portion 314. In some implementations, the first section of the bottom base 311 may include a first circuit board 380 including a first plurality of electronic components. For example, the first plurality of electronic components may include one or more encoders 382 and one or more controllers 384.

The second section of the bottom base 311 is disposed between the third protruding portion 316 and the second protruding portion 318. In some implementations, the second section of the bottom base 311 may include a second circuit board 370 including a second plurality of electronic components. For example, the second plurality of electronic components may include one or more coils 372 and one or more drive circuits 374. In some implementations, the one or more coils 372 may include voice coils, air coils, drive coils, etc. In some implementations, the one or more drive circuits 374 may include one or more H-bridge circuits.

Referring to the third view 3300 of FIG. 3C, a second flexure stage of the scanner 3000 includes a first flexure component 342 having a first plurality of spring components (e.g., a first spring component 342*a*, a second spring component 342*b*, a third spring component 342*c*, and a fourth spring component 342*d*), a second flexure component 344 having a second plurality of spring components (e.g., a first spring component 344*a*, a second spring component 344*b*, a third spring component 344*c*, and a fourth spring component 344*d*), a third flexure component 346 having a third plurality of spring components (e.g., a first spring component 346*a*, a second spring component 346*b*, a third spring component 346*c*, and a fourth spring component 346*d*), and a fourth flexure component 348 having a fourth plurality of spring components (e.g., a first spring component 348*a*, a second spring component 348*b*, a third spring component 348*c*, and a fourth spring component 348*d*). In some implementations, the spring components of the second flexure stage may include a leaf-spring. In the example scanner 3000, each flexure component of the second flexure stage has four spring components, however the disclosure is not limited to this example. In some implementations, each flexure component may have less than or more than four spring components (e.g., two spring components, the spring components, five spring components, etc.).

Each of the first plurality of spring components of the first flexure component 342 has a first end disposed in and coupled to respective grooves 330*a* at a first end of a first bridge portion 330 and a second end disposed in and coupled to respective grooves 321*b* of the rotatable pivot body 321 of the rotatable base 320. In some implementations, the first end of a spring component is welded to the first bridge portion 330. However, the disclosure is not limited to this implementation and the first end of the spring component may be secured to the first bridge portion 330 via other additional and/or alternative methods (e.g., adhesives, fixing components, etc.). In some implementations, the second end of the spring component is welded to the rotatable pivot body 321. However, the disclosure is not limited to this implementation and the second end of the spring component may be secured to the rotatable pivot body 321 via other additional and/or alternative methods (e.g., adhesives, fixing components, etc.).

Each of the first plurality of spring components of the second flexure component 344 has a first end disposed in and coupled to respective grooves 330*b* at a second end of the first bridge portion 330 and a second end disposed in and coupled to respective grooves (not labeled) of the rotatable pivot body 321 of the rotatable base 320. In some implementations, the first end of a spring component is welded to the first bridge portion 330. However, the disclosure is not limited to this implementation and the first end of the spring component may be secured to the first bridge portion 330 via other additional and/or alternative methods (e.g., adhesives, fixing components, etc.). In some implementations, the second end of the spring component is welded to the rotatable pivot body 321. However, the disclosure is not limited to this implementation and the second end of the spring component may be secured to the rotatable pivot body 321 via other additional and/or alternative methods (e.g., adhesives, fixing components, etc.).

The first flexure stage and the second flexure stage (and their corresponding flexure components and spring components) may be configured to be driven at their natural resonant frequency which causes the spring components to resonate or vibrate, thereby causing the rotatable base 320 and the scan element 390 (e.g., a mirror) to be rotated via the pivot body 321. The scan element 390 can be rotated over a large range (e.g., over 80 degrees of scan angle) and thus has a large field of view while consuming a low amount of power (e.g., less than ten watts, less than five watts, etc.).

As shown in FIG. 3C, the third flexure component 346 and fourth flexure component 348 are each coupled to a second bridge portion 332 and have a similar configuration as the first flexure component 342 and second flexure component 344, and therefore a repeated description thereof will be omitted for the sake of brevity.

Referring to FIG. 3B, in view 3200 the rotatable base 320 of the scanner 3000 may further include a cover 323 to cover (at least partially) the flexure components of the second flexure stage. The cover 323 may include one or more portions which are configured to accommodate one or more magnets 325 (e.g., permanent magnets) which may be disposed adjacent to the one or more coils 372 so as to face the one or more coils 372.

In some implementations, the one or more coils 372 may be mounted on a first side of the fixed base 310 and be wound about an axis A2 which is parallel to an axis of rotation A1 of the scan element 390 as well as an axis of rotation of the rotatable base 320. When a current is applied to the one or more coils 372, the flux direction is parallel to the axis of rotation of the scan element 390 and the axis of rotation of the rotatable base 320. The magnetic field generated by the one or more coils 372 interacts with the magnetic field of the one or more magnets 325, and a force (a torque) is exerted on the one or more magnets 325.

For example, the one or more magnets 325 may be disposed in the cover 323 such that an upper surface of the one or more magnets 325 is flush with an upper surface of the cover 323. The rotatable base 320 may include a mount portion 327 that includes at least one groove in which the scan element 390 can be disposed. In some implementations, the mount portion 327 may be welded to the cover 323 of the rotatable base 320 to fix the mount portion 327 to the cover 323 (e.g., via spot welds 327*a*). However, the disclosure is not limited to this implementation and the mount portion 327 may be secured to the cover 323 via other additional and/or alternative methods (e.g., adhesives, fixing components, etc.). The scan element 390 (e.g., a mirror) may be mounted to the mount portion 327 which can be coupled to the pivot body 321. The scan element 390, mount portion 327, and pivot body 32 can rotate about the same axis of rotation A1.

As described herein, the scanner 3000 according to examples of the disclosure includes first and second flexure stages which have a high-deflection compound beam geometry. An on-axis transverse scan element 390 is mounted in a manner to have collision-free high deflection angles. The configuration of the sub-structure (which may be formed of metal) including the fixed base 310 and rotatable base 320 further allows for installing drive and sense electronics in a compact manner while the spring components of the flexure components forming the first and second flexure stages may be formed of treated materials having a high deflection performance.

FIG. 3D depicts a fourth view 3400 illustrating the deformation of first and second flexure stages while the one or more coils 372 are driven. Referring to FIGS. 3C-3D, the scanner 3000 includes the first flexure stage 3010 including the first flexure component 322 having the first plurality of spring components (e.g., the first spring component 322*a*, the second spring component 322*b*, the third spring component 322*c*, and the fourth spring component 322*d*), the second flexure component 324 having the second plurality of spring components (e.g., the first spring component 324*a*, the second spring component 324*b*, the third spring component 324*c*, and the fourth spring component 324*d*), the third flexure component 326 having the third plurality of spring components (e.g., the first spring component 326*a*, the second spring component 326*b*, the third spring component 326*c*, and the fourth spring component 326*d*), and the fourth flexure component 328 having the fourth plurality of spring components (e.g., the first spring component 328*a*, the second spring component 328*b*, the third spring component 328*c*, and the fourth spring component 328*d*). In the example scanner 3000, each flexure component of the first flexure stage has four spring components, however the disclosure is not limited to this example. In some implementations, each flexure component may have less than or more than four spring components (e.g., two spring components, three spring components, five spring components, etc.).

Each of the flexure components 322, 324, 326, 328 of the first flexure stage 3010 are configured to oscillate when the one or more coils 372 are driven which causes torque to be applied to the rotatable base 320 including the one or more magnets 325. That is, the flexure components 322, 324, 326, 328 of the first flexure stage 3010 are formed of a material that can be excited at its fundamental (resonant) frequency. An example configuration of the flexure components 322, 324, 326, 328 of the first flexure stage 3010 may be as follows. In some implementations, each of the flexure components 322, 324, 326, 328 of the first flexure stage 3010 may include a plurality of spring components, for example, leaf-type isosceles-trapezoidal flexure spring components. The flexure components 322, 324, 326, 328 of the first flexure stage 3010 extend radially from the pivot body 321. Spring components of each flexure component can be disposed in parallel which can allow for extremely large deflections without high stresses to occur, enabling scanned fields of view larger than 100 degrees to be achieved. Additionally, the flexure components 322, 324, 326, 328 of the first flexure stage 3010 are resistant to movement or deformation in an out of plane motion, thereby maintaining the structural stability of the scanner 3000 and reducing unwanted vibrations. As already described, each flexure component 322, 324, 326, 328 may include a plurality of spring components that are disposed between and coupled to the pivot body 321 and a respective outer rigid body (e.g., protruding portions 312, 314, 316, 318). The plurality of spring components may be spaced apart in a circumferential direction R1 of the rotatable base 320. The plurality of spring components may be thin flat metal plates formed of steel, for example, stainless steel (e.g., precipitation stainless steel), and may include one or more interstitial additives (e.g., copper, aluminum, etc.) that enhance the durability and/or strength of the spring component. For example, the outer rigid body (e.g., protruding portions 312, 314, 316, 318) and the pivot body 321 may be formed of stainless steel (e.g., 410 stainless steel having a magnetic martensitic structure). Referring to FIG. 3C, the first flexure component 322, second flexure component 324, third flexure component 326, and fourth flexure component 328 may be spaced apart from each other in the circumferential direction R1 of the rotatable base 320. The first flexure component 322 and the fourth flexure component 328 may be diametrically opposed to each other with respect to the pivot body 321. The second flexure component 324 and the third flexure component 326 may be diametrically opposed to each other with respect to the pivot body 321. In some implementations, for each of the flexure components 322, 324, 326, 328, spring components forming a particular flexure component may be separated or spaced apart from each other by about 1 degree to about 3 degrees (more particularly, about 2 degrees) in the circumferential direction R1 of the rotatable base 320. In some implementations, flexure components 322 and 324 may be separated or spaced apart from each other by about 45 degrees to about 65 degrees (more particularly from about 50 degrees to about 60 degrees) in the circumferential direction R1 of the rotatable base 320. In some implementations, flexure components 326 and 328 may be separated or spaced apart from each other by about 45 degrees to about 65 degrees (more particularly from about 50 degrees to about 60 degrees) in the circumferential direction R1 of the rotatable base 320.

Each of the flexure components 342, 344, 346, 348 of the second flexure stage 3020 are also configured to oscillate when the one or more coils 372 are driven which causes torque to be applied to the rotatable base 320 including the one or more magnets 325. That is, the flexure components 342, 344, 346, 348 of the second flexure stage 3020 are formed of a material that can be excited at its fundamental (resonant) frequency. The oscillation (deflection) of the flexure components 342, 344, 346, 348 of the second flexure stage 3020 cause the pivot body 321, and thereby the scan element 390 coupled to the pivot body 321, to rotate. An example configuration of the flexure components 342, 344, 346, 348 of the second flexure stage 3020 may be as follows. In some implementations, each of the flexure components 342, 344, 346, 348 of the second flexure stage 3020 may include a plurality of spring components, for example, leaf-type isosceles-trapezoidal flexure spring components.

The flexure components 342, 344, 346, 348 of the second flexure stage 3020 extend radially from the pivot body 321. Spring components of each flexure component can be disposed in parallel which can allow for extremely large deflections without high stresses to occur, enabling scanned fields of view larger than 100 degrees to be achieved. Additionally, the flexure components 342, 344, 346, 348 of the second flexure stage 3020 are resistant to movement or deformation in an out of plane motion, thereby maintaining the structural stability of the scanner 3000 and reducing unwanted vibrations. As already described, each flexure component 342, 344, 346, 348 may include a plurality of spring components that are disposed between and coupled to the pivot body 321 and a respective outer rigid body (e.g., bridge portions 330, 332). The plurality of spring components may be spaced apart in a circumferential direction R1 of the rotatable base 320. The plurality of spring components may be thin flat metal plates formed of steel, for example, stainless steel (e.g., precipitation stainless steel), and may include one or more interstitial additives (e.g., copper, aluminum, etc.) that enhance the durability and/or strength of the spring component. For example, the outer rigid body (e.g., bridge portions 330, 332) and the pivot body 321 may be formed of stainless steel (e.g., 410 stainless steel having a magnetic martensitic structure). In some implementations, the first bridge portion 330 and the second bridge portion 332 are coupled to the rotatable base 320, such that the second flexure stage is coupled to the rotatable base 320. Referring to FIG. 3C, the first flexure component 342, second flexure component 344, third flexure component 346, and fourth flexure component 348 may be spaced apart from each other in the circumferential direction R1 of the rotatable base 320. The first flexure component 342 and the fourth flexure component 348 may be diametrically opposed to each other with respect to the pivot body 321. The second flexure component 344 and the third flexure component 346 may be diametrically opposed to each other with respect to the pivot body 321. In some implementations, for each of the flexure components 342, 344, 346, 348, spring components forming a particular flexure component may be separated or spaced apart from each other by about 1 degree to about 3 degrees (more particularly, about 2 degrees) in the circumferential direction R1 of the rotatable base 320. In some implementations, flexure components 342 and 344 may be separated or spaced apart from each other by about 10 degrees to about 20 degrees (more particularly from about 10 degrees to about 15 degrees) in the circumferential direction R1 of the rotatable base 320. In some implementations, flexure components 346 and 348 may be separated or spaced apart from each other by about 10 degrees to about 20 degrees (more particularly from about 10 degrees to about 15 degrees) in the circumferential direction R1 of the rotatable base 320.

To achieve a compact structure, in some implementations, various components may be disposed within a radial length of a flexure component. For example, each of the flexure components 322, 324 can have a radial length which extends in a radial direction of the rotatable base 320 from the pivot body 321 to an outer rigid body (e.g., protruding portions 312, 314) of the fixed base 310. In some implementations, the one or more coils 372 and/or the one or more magnets 325 may be disposed in a space within the radial length of the flexure components 322, 324. For example, the one or more coils 372 may be disposed (e.g., on the fixed based 310) between the third flexure component 326 and the fourth flexure component 328 in the circumferential direction of the rotatable base 320. For example, the one or more magnets 325 may be disposed (e.g., on the rotatable base 320) between the third flexure component 326 and the fourth flexure component 328 in the circumferential direction of the rotatable base 320. The one or more coils 372 may be spaced apart from the one or more magnets 325 in a direction parallel to an axis A1 of rotation of the rotatable base 320.

In some implementations, the scanner 3000 includes the one or more drive circuits 374 which are configured to provide a driving signal to the one or more coils 372. For example, the one or more drive circuits 374 may include a H-bridge circuit that is configured to repeatedly reverse a polarity of the voltage or reverse a direction of the current applied to the one or more coils 372, thereby exerting a force (torque) in alternating directions with respect to the one or more magnets 325. For example, the one or more drive circuits 374 may be disposed (e.g., on the fixed based 310) between the third flexure component 326 and the fourth flexure component 328 in the circumferential direction of the rotatable base 320. The one or more drive circuits 374 may be disposed between adjacent flexure components among the plurality of flexure components of the first flexure stage 3010 (e.g., in a space within the radial length of the plurality of flexure components of the first flexure stage 3010).

In some implementations, the fixed base 310 can further include one or more encoders 382 (e.g., a quadrature encoder) configured to measure at least one of a position of the rotatable base 320 and a direction of movement of the rotatable base 320. The one or more encoders 382 may be disposed between adjacent flexure components among the plurality of flexure components of the first flexure stage 3010 (e.g., in a space within the radial length of the plurality of flexure components of the first flexure stage 3010). For example, the one or more encoders 382 may be disposed on an opposite side of the fixed base 310 at which the one or more coils 372 are disposed. For example, the one or more encoders 382 may be disposed (e.g., on the fixed base 310) between the first flexure component 322 and the second flexure component 324 in the circumferential direction of the rotatable base 320.

In some implementations, the fixed base 310 can further include one or more controllers 384 (e.g., a microcontroller) configured to control a supply of power or current to drive the one or more coils 372. The one or more controllers 384 may be disposed between adjacent flexure components among the plurality of flexure components of the first flexure stage 3010 (e.g., in a space within the radial length of the plurality of flexure components of the first flexure stage 3010). For example, the one or more controllers 384 may be disposed on an opposite side of the fixed base 310 at which the one or more coils 372 are disposed. For example, the one or more controllers 384 may be disposed (e.g., on the fixed base 310) between the first flexure component 322 and the second flexure component 324 in the circumferential direction of the rotatable base 320.

For example, the one or more controllers 384 may be configured to control one or more power sources of the LIDAR system to supply power to the one or more coils 372 to drive the one or more coils 372 via the one or more drive circuits 374, which causes the force (torque) to be exerted on the one or more magnets 325, thereby causing the flexure components of the first flexure stage 3010 and the second flexure stage 3020 to oscillate. Based on information provided by the one or more encoders 382, the one or more controllers 384 may be configured to control the power (e.g., the current) supplied to the one or more coils 372 to ensure a phase lock between frequencies of the one or more coils 372 and the rotation of the rotatable base 320 so that the rotatable base 320 (and correspondingly the scan element 390) rotates at the resonant frequency of the flexure components of the first flexure stage 3010 and the second flexure stage 3020. According to examples of the disclosure, the quality factor (the Q-factor which quantifies how sharply a resonant system oscillates at its natural frequency) associated with the rotation of the rotatable base 320 (and correspondingly the scan element 390), may be at least 100.

The scan element 390 may be configured to rotate via rotation of the rotatable base 420 and to direct the light emitted by the light source to an environment of the vehicle. The scan element 390 can include a mirror that can be adjusted to enable the LIDAR system to have a variable field of view, where the field of view can be adjusted according to a magnitude of a supply of current supplied to drive the one or more coils 372. In some implementations, the variable field of view can range from between about 0 degrees and about 150 degrees. In some implementations, the mirror has a reflective surface area of between about five square inches and about ten square inches. As depicted in FIGS. 3A-3B, the scan element 390 has a circular shape. However, the disclosure is not limited to this example and the scan element 390 can have a hexagonal shape, an ellipse shape, a square shape, etc.

Figure 4A:
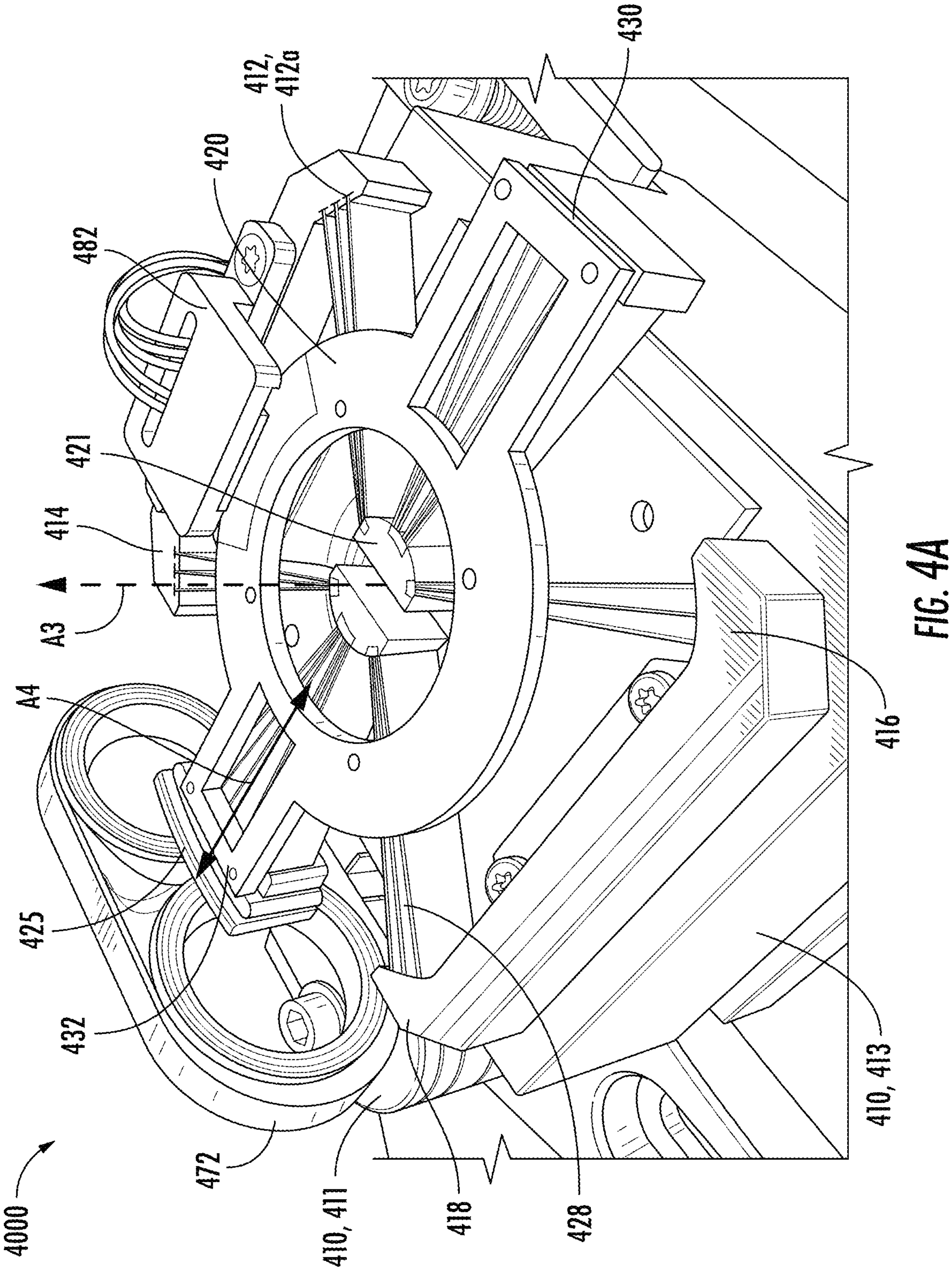
FIG. 4A-4C depict an example scanner system for a LIDAR system, according to some implementations of the disclosure.
Figure 4B:
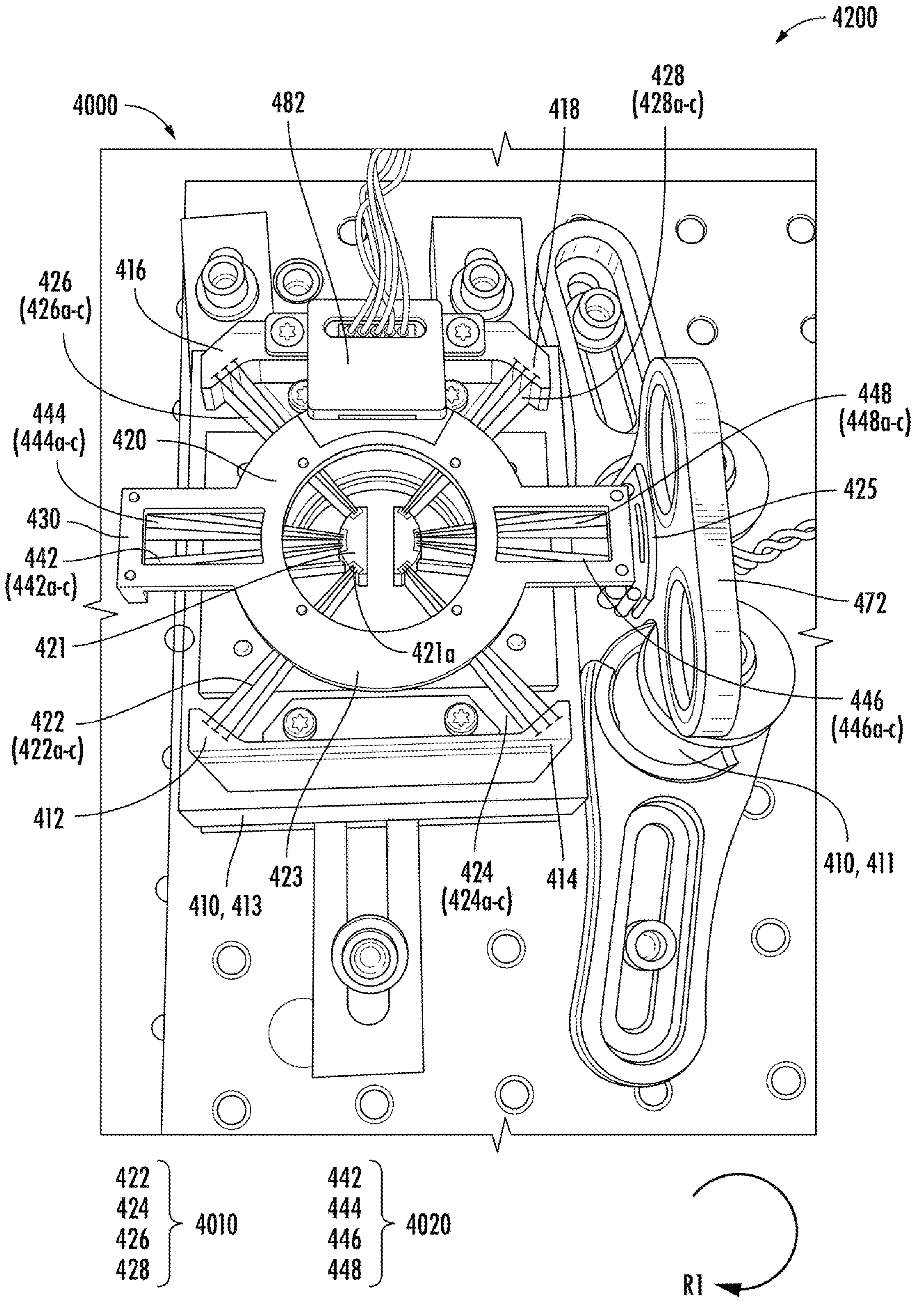
Figure 4C:
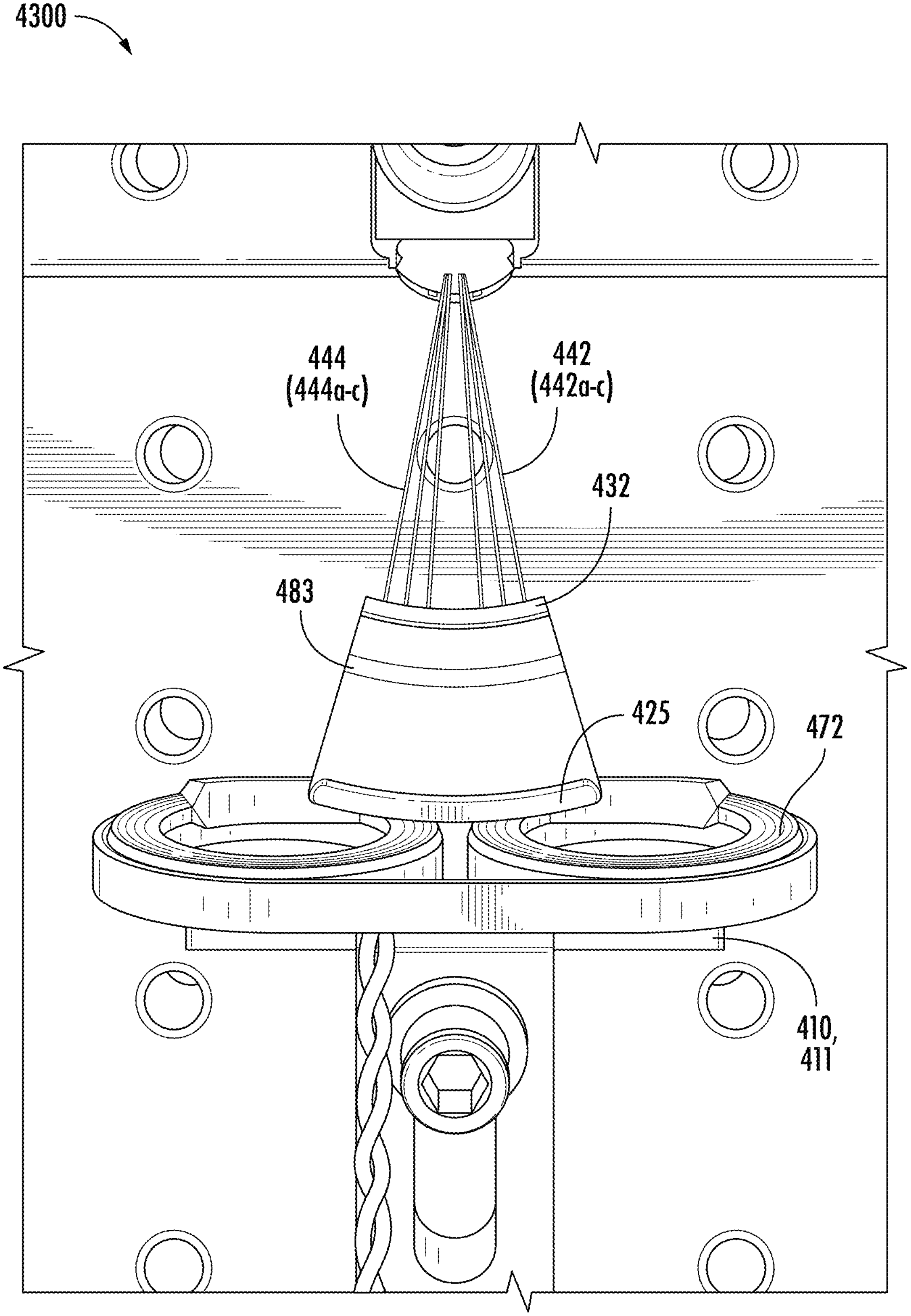

FIGS. 4A-4C depict example aspects of a scanner 4000 for a LIDAR system. FIG. 4A depicts a front perspective view (first view 4100) of the scanner, FIG. 4B depicts a plan view (second view 4200) of the scanner, and FIG. 4C depicts an enlarged view (third view 4300) of the one or more coils and one or more magnets of the scanner. Referring to FIG. 4A, the first view 4100 shows a front perspective view of the scanner 4000 including a structure (e.g., metal structure) having a fixed base 410 (a first portion), a rotatable base 420 (a second portion), and a pivot body 421 to which a scan element (not shown) can be coupled via a mounting portion coupled to the pivot body 421 in a manner similar to the example scanner 3000 of FIGS. 3A-3D. The scan element can be similar to the scan element 390 and therefore a repeated description thereof will be omitted for the sake of brevity. The scanner 4000 may be implemented in various LIDAR systems, including a time-of-flight (ToF) LIDAR system.

As depicted in FIGS. 4A-4B, the fixed base 410 can include a first base 411 (lower base) and a second base 413 disposed on the first base 411. A plurality of first protruding portions can be disposed on one side (a first side) of the second base 413 and can include a first protruding portion 412 and a second protruding portion 414. For example, a plurality of second protruding portions can be disposed on another side (a second side) of the second base 413 and can include a third protruding portion 416 and a fourth protruding portion 418. Each of the first protruding portions and the second protruding portions can include grooves disposed in an inner side surface facing the rotatable base 420. As will be described in further detail, flexure components of a first flexure stage of the scanner 4000 are coupled to respective grooves provided in each of the first protruding portions and the second protruding portions. For example, referring to the first protruding portion 412, grooves 412*a* are disposed on an inner side surface of the first protruding portion 412 which faces the rotatable base 420.

Referring to the second view 4400 of FIG. 4B, a first flexure stage 4010 of the scanner 4000 includes a first flexure component 422 having a first plurality of spring components (e.g., a first spring component 422*a*, a second spring component 422*b*, and a third spring component 422*c*), a second flexure component 424 having a second plurality of spring components (e.g., a first spring component 424*a*, a second spring component 424*b*, and a third spring component 424*c*), a third flexure component 426 having a third plurality of spring components (e.g., a first spring component 426*a*, a second spring component 426*b*, and a third spring component 426*c*), and a fourth flexure component 428 having a fourth plurality of spring components (e.g., a first spring component 428*a*, a second spring component 428*b*, and a third spring component 428*c*). In some implementations, the spring components of the first flexure stage may include a leaf-spring.

Each of the first plurality of spring components of the first flexure component 422 has a first end disposed in and coupled to respective grooves 412*a* of the first protruding portion 412 and a second end disposed in and coupled to respective grooves 421*a* of a rotatable pivot body 421. In some implementations, the rotatable pivot body 421 is a floating component that is attached or coupled to the first and second flexure stages, and is not directly connected to the rotatable base 420 or the fixed base 410. In some implementations, the first end of a spring component is welded to the first protruding portion 412. However, the disclosure is not limited to this implementation and the first end of the spring component may be secured to the first protruding portion 412 via other additional and/or alternative methods (e.g., adhesives, fixing components, etc.). In some implementations, the second end of the spring component is welded to the rotatable pivot body 421. However, the disclosure is not limited to this implementation and the second end of the spring component may be secured to the rotatable pivot body 421 via other additional and/or alternative methods (e.g., adhesives, fixing components, etc.).

As shown in FIG. 4B, the second flexure component 424, third flexure component 426, and fourth flexure component 428 have a similar configuration as the first flexure component 422 and therefore a repeated description thereof will be omitted for the sake of brevity.

A first section of the second base 413 may be disposed between the third protruding portion 416 and the fourth protruding portion 418. In some implementations, the first section of the second base 413 may include one or more first electronic components. For example, the one or more first electronic components may include one or more encoders 482.

In some implementations, one or more coils 472 (e.g., voice coils, air coils, drive coils, etc.) may be disposed on (mounted to) the first base 411 which is adjacent to the second base 413 and spaced apart from the rotatable base 420.

The scanner 4000 may further include a second flexure stage 4020 which includes a first flexure component 442 having a first plurality of spring components (e.g., a first spring component 442*a*, a second spring component 442*b*, and a third spring component 442*c*), a second flexure component 444 having a second plurality of spring components (e.g., a first spring component 444*a*, a second spring component 444*b*, and a third spring component 444*c*), a third flexure component 446 having a third plurality of spring components (e.g., a first spring component 446*a*, a second spring component 446*b*, and a third spring component 446*c*), and a fourth flexure component 448 having a fourth plurality of spring components (e.g., a first spring component 448*a*, a second spring component 448*b*, and a third spring component 448*c*). In some implementations, the spring components of the second flexure stage may include a leaf-spring.

Each of the first plurality of spring components of the first flexure component 442 has a first end disposed in and coupled to respective grooves (not visible) at a first end of a first bridge portion 430 and a second end disposed in and coupled to respective grooves 421*b* of the rotatable pivot body 421 of the rotatable base 420. In some implementations, the first end of a spring component is welded to the first bridge portion 430. However, the disclosure is not limited to this implementation and the first end of the spring component may be secured to the first bridge portion 430 via other additional and/or alternative methods (e.g., adhesives, fixing components, etc.). In some implementations, the second end of the spring component is welded to the rotatable pivot body 421. However, the disclosure is not limited to this implementation and the second end of the spring component may be secured to the rotatable pivot body 421 via other additional and/or alternative methods (e.g., adhesives, fixing components, etc.).

Each of the first plurality of spring components of the second flexure component 444 has a first end disposed in and coupled to respective grooves at a second end of the first bridge portion 440 and a second end disposed in and coupled to respective grooves (not labeled) of the rotatable pivot body 421 of the rotatable base 420. In some implementations, the first end of a spring component is welded to the first bridge portion 440. However, the disclosure is not limited to this implementation and the first end of the spring component may be secured to the first bridge portion 440 via other additional and/or alternative methods (e.g., adhesives, fixing components, etc.). In some implementations, the second end of the spring component is welded to the rotatable pivot body 421. However, the disclosure is not limited to this implementation and the second end of the spring component may be secured to the rotatable pivot body 421 via other additional and/or alternative methods (e.g., adhesives, fixing components, etc.).

The first flexure stage 4010 and the second flexure stage 4020 (and their corresponding flexure components and spring components) may be configured to be driven at their natural resonant frequency which causes the spring components to resonate or vibrate, thereby causing the rotatable base 420 and the scan element (e.g., a mirror) to be rotated via the pivot body 421. The scan element can be rotated over a large range (e.g., over 80 degrees of scan angle) and thus has a large field of view while consuming a low amount of power (e.g., less than ten watts, less than five watts, etc.).

As shown in FIG. 4B the third flexure component 446 and fourth flexure component 448 are each coupled to a second bridge portion 432 and have a similar configuration as the first flexure component 442 and second flexure component 444, and therefore a repeated description thereof will be omitted for the sake of brevity. In some implementations, the first bridge portion 430 and the second bridge portion 432 are coupled to the rotatable base 420, such that the second flexure stage is coupled to the rotatable base 420.

Referring to FIG. 4B, in view 4200 the rotatable base 420 of the scanner 4000 may further include a cover 423 to cover (at least partially) the flexure components of the second flexure stage 4020.

In some implementations, the one or more coils 472 may be mounted on a first side of the second base 413 and be wound about an axis A4 which is perpendicular to an axis of rotation A3 of the scan element as well as an axis of rotation of the rotatable base 420. For example, when a current is applied to the one or more coils 472, the flux direction is perpendicular to the axis of rotation A3 of the scan element and the axis of rotation A3 of the rotatable base 420. The magnetic field generated by the one or more coils 472 interacts with the magnetic field of the one or more magnets 425, and a force (a torque) is exerted on the one or more magnets 425.

As depicted in FIG. 4C, the one or more magnets 425 may be disposed at an end portion (outer side surface) of the bridge portion 432 such that an outer circumferential side surface of the one or more magnets 425 is spaced apart from the one or more coils 472 in the radial direction of the rotatable base 420.

As described herein, the scanner 4000 according to examples of the disclosure includes first and second flexure stages 4010, 4020 which have a high-deflection compound beam geometry. The first flexure stage 4010 includes the first flexure component 422 having the first plurality of spring components (e.g., the first spring component 422*a*, the second spring component 422*b*, and the third spring component 422*c*), the second flexure component 424 having the second plurality of spring components (e.g., the first spring component 424*a*, the second spring component 424*b*, and the third spring component 424*c*), the third flexure component 426 having the third plurality of spring components (e.g., the first spring component 426*a*, the second spring component 426*b*, and the third spring component 426*c*), and the fourth flexure component 428 having the fourth plurality of spring components (e.g., the first spring component 428*a*, the second spring component 428*b*, and the third spring component 428*c*).

Each of the flexure components 422, 424, 426, 428 of the first flexure stage 4010 are configured to oscillate when the one or more coils 472 are driven which causes torque to be applied to the rotatable base 420 including the one or more magnets 425. That is, the flexure components 422, 424, 426, 428 of the first flexure stage 4010 are formed of a material that can be excited at its fundamental (resonant) frequency. Each of the flexure components 422, 424, 426, 428 of the first flexure stage 4010 may include a plurality of spring components, for example, leaf-type isosceles-trapezoidal flexure spring components. The flexure components 422, 424, 426, 428 of the first flexure stage 4010 extend radially from the pivot body 421. Spring components of each flexure component can be disposed in parallel which can allow for extremely large deflections without high stresses to occur, enabling scanned fields of view larger than 100 degrees to be achieved. Additionally, the flexure components 422, 424, 426, 428 of the first flexure stage 4010 are resistant to movement or deformation in an out of plane motion, thereby maintaining the structural stability of the scanner 4000 and reducing unwanted vibrations. As already described, each flexure component 422, 424, 426, 428 may include a plurality of spring components that are disposed between and coupled to the pivot body 421 and a respective outer rigid body (e.g., protruding portions 412, 414, 416, 418). The plurality of spring components may be spaced apart in a circumferential direction R1 of the rotatable base 420. The plurality of spring components may be thin flat metal plates formed of steel, for example, stainless steel (e.g., precipitation stainless steel), and may include one or more interstitial additives (e.g., copper, aluminum, etc.) that enhance the durability and/or strength of the spring component. For example, the outer rigid body (e.g., protruding portions 412, 414, 416, 418) and the pivot body 421 may be formed of stainless steel (e.g., 410 stainless steel having a magnetic martensitic structure). Referring to FIG. 4B, the first flexure component 422, second flexure component 424, third flexure component 426, and fourth flexure component 428 may be spaced apart from each other in the circumferential direction R1 of the rotatable base 420. The first flexure component 422 and the fourth flexure component 428 may be diametrically opposed to each other with respect to the pivot body 421. The second flexure component 424 and the third flexure component 426 may be diametrically opposed to each other with respect to the pivot body 421. In some implementations, for each of the flexure components 422, 424, 426, 428, spring components forming a particular flexure component may be separated or spaced apart from each other by about 1 degree to about 4 degrees (more particularly, about 2 degrees) in the circumferential direction R1 of the rotatable base 420. In some implementations, flexure components 422 and 424 may be separated or spaced apart from each other by about 45 degrees to about 65 degrees (more particularly from about 50 degrees to about 60 degrees) in the circumferential direction R1 of the rotatable base 420. In some implementations, flexure components 426 and 428 may be separated or spaced apart from each other by about 45 degrees to about 65 degrees (more particularly from about 50 degrees to about 60 degrees) in the circumferential direction R1 of the rotatable base 420.

Each of the flexure components 442, 444, 446, 448 of the second flexure stage 4020 are also configured to oscillate when the one or more coils 472 are driven which causes torque to be applied to the rotatable base 420 including the one or more magnets 425. That is, the flexure components 442, 444, 446, 448 of the second flexure stage 4020 are formed of a material that can be excited at its fundamental (resonant) frequency. The oscillation (deflection) of the flexure components 442, 444, 446, 448 of the second flexure stage 4020 cause the pivot body 421, and thereby the scan element (not shown) coupled to the pivot body 421, to rotate. An example configuration of the flexure components 442, 444, 446, 448 of the second flexure stage 4020 may be as follows. In some implementations, each of the flexure components 442, 444, 446, 448 of the second flexure stage 4020 may include a plurality of spring components, for example, leaf-type isosceles-trapezoidal flexure spring components. The flexure components 442, 444, 446, 448 of the second flexure stage 4020 extend radially from the pivot body 421. Spring components of each flexure component can be disposed in parallel which can allow for extremely large deflections without high stresses to occur, enabling scanned fields of view larger than 100 degrees to be achieved. Additionally, the flexure components 442, 444, 446, 448 of the second flexure stage 4020 are resistant to movement or deformation in an out of plane motion, thereby maintaining the structural stability of the scanner 4000 and reducing unwanted vibrations. As already described, each flexure component 442, 444, 446, 448 may include a plurality of spring components that are disposed between and coupled to the pivot body 421 and a respective outer rigid body (e.g., bridge portions 430, 432). The plurality of spring components may be spaced apart in a circumferential direction R1 of the rotatable base 420. The plurality of spring components may be thin flat metal plates formed of steel, for example, stainless steel (e.g., precipitation stainless steel), and may include one or more interstitial additives (e.g., copper, aluminum, etc.) that enhance the durability and/or strength of the spring component. For example, the outer rigid body (e.g., bridge portions 430, 432) and the pivot body 421 may be formed of stainless steel (e.g., 410 stainless steel having a magnetic martensitic structure). Referring to FIG. 4B, the first flexure component 442, second flexure component 444, third flexure component 446, and fourth flexure component 448 may be spaced apart from each other in the circumferential direction R1 of the rotatable base 420. The first flexure component 442 and the fourth flexure component 448 may be diametrically opposed to each other with respect to the pivot body 421. The second flexure component 444 and the third flexure component 446 may be diametrically opposed to each other with respect to the pivot body 421. In some implementations, for each of the flexure components 442, 444, 446, 448, spring components forming a particular flexure component may be separated or spaced apart from each other by about 1 degree to about 4 degrees (more particularly, about 2 degrees) in the circumferential direction R1 of the rotatable base 420. In some implementations, flexure components 442 and 444 may be separated or spaced apart from each other by about 10 degrees to about 20 degrees (more particularly from about 10 degrees to about 15 degrees) in the circumferential direction R1 of the rotatable base 420. In some implementations, flexure components 446 and 448 may be separated or spaced apart from each other by about 10 degrees to about 20 degrees (more particularly from about 10 degrees to about 15 degrees) in the circumferential direction R1 of the rotatable base 420.

In some implementations, the scanner 4000 includes one or more drive circuits and one or more controllers (not shown), which can be configured to drive the one or more coils 472. In some implementations, the one or more drive circuits and one or more controllers may be disposed on the fixed base 410 or may be disposed away from the fixed base 410. For example, the one or more drive circuits may include a H-bridge circuit that is configured to repeatedly reverse a polarity of the voltage or reverse a direction of the current applied to the one or more coils 472, thereby exerting a force (torque) in alternating directions with respect to the one or more magnets 425.

In some implementations, the one or more encoders 482 (e.g., a quadrature encoder) may be configured to measure at least one of a position of the rotatable base 420 and a direction of movement of the rotatable base 420, for example, based on information obtained from an encoder strip 483 disposed between the bridge portion 432 and the one or more magnets 425. The one or more encoders 482 may be disposed at a position spaced apart from (e.g., above) an upper surface of the rotatable base 420. For example, the one or more encoders 482 may be disposed between adjacent flexure components among the plurality of flexure components of the first flexure stage 4010 (e.g., in a space within the radial length of the plurality of flexure components of the first flexure stage 4010). For example, the one or more encoders 482 may be disposed on a side of the second base 413 which is adjacent to a side of the second base 413 at which the one or more coils 472 are spaced apart from. For example, the one or more encoders 482 may be disposed (e.g., on the fixed base 410) between the third flexure component 426 and the fourth flexure component 428 in the circumferential direction of the rotatable base 420. The positioning of the one or more encoders 482 can allow for greater rotational movement of the scan element.

For example, the one or more controllers may be configured to control one or more power sources of the LIDAR system to supply power to the one or more coils 472 to drive the one or more coils 472 via the one or more drive circuits, which causes the force (torque) to be exerted on the one or more magnets 425, thereby causing the flexure components of the first flexure stage 4010 and the second flexure stage 4020 to oscillate. Based on information provided by the one or more encoders 482, the one or more controllers may be configured to control the power (e.g., the current) supplied to the one or more coils 472 to ensure a phase lock between frequencies of the one or more coils 472 and the rotation of the rotatable base 420 so that the rotatable base 420 (and correspondingly the scan element) rotates at the resonate frequency of the flexure components of the first flexure stage 4010 and the second flexure stage 4020.

Figure 5:
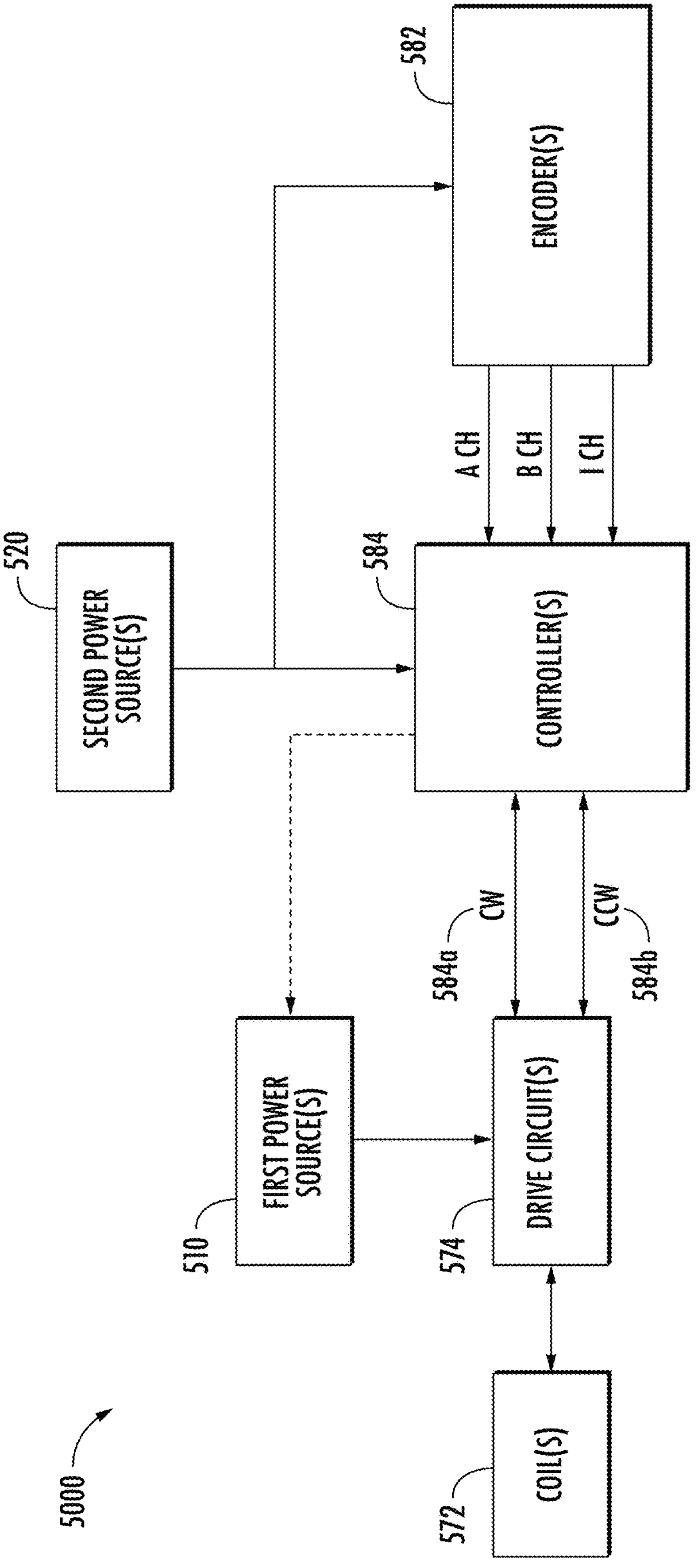
FIG. 5 depicts a block diagram of an example drive control system for a LIDAR system, according to some implementations of the disclosure.

FIG. 5 depicts a block diagram of an example drive control system 5000 for a LIDAR system. Referring to FIG. 5, the drive control system 5000 includes one or more coils 572, one or more drive circuits 574, one or more encoders 582, one or more controllers 584, one or more first power sources 510, and one or more second power sources 520. The one or more coils 572 may correspond to the one or more coils 372 or the one or more coils 472. The one or more drive circuits 574 may correspond to the one or more drive circuits 374 or the one or more drive circuits 474. The one or more encoders 582 may correspond to the one or more encoders 382 or the one or more encoders 482. The one or more controllers 584 may correspond to the one or more controllers 384 or the one or more controllers 484, for example. The one or more second power sources 520 may be configured to supply power (e.g., with a voltage of about 3 volts to about 5 volts) to the one or more controllers 584 and the one or more encoders 582.

According to examples of the disclosure, the one or more controllers 584 may be configured to provide one or more control signals 584*a*, 584*b* to the one or more first power sources 510 and/or the one or more drive circuits 574 to drive the one or more coils 572. For example, the one or more control signals 584*a*, 584*b* can include a control signal which controls the one or more drive circuits 574 to cause current to flow through the one or more coils 572 in a first direction, thereby causing the rotatable base to rotate in a first direction (e.g., a clockwise direction). For example, the one or more control signals 584*a*, 584*b* can include another control signal which controls the one or more drive circuits 574 to cause current to flow through the one or more coils 572 in a second direction (opposite to the first direction), thereby causing the rotatable base to rotate in a second direction (e.g., a counterclockwise direction). When the one or more coils 572 are driven (e.g., when a current is applied to the one or more coils), the magnetic field generated by the one or more coils 572 interacts with the magnetic field of the one or more magnets (not shown) of the scanner, and a force (a torque) is exerted on the one or more magnets which are disposed at the rotatable base of the scanner. As described herein, the flexure components associated with the first flexure stage and the flexure components associated with the second flexure stage are configured to oscillate in response to the torque that is applied to the rotatable base. When the torque is exerted on the one or more magnets and the flexure components associated with the first flexure stage and the flexure components associated with the second flexure stage oscillate, the rotatable base rotates, which also causes the scan element coupled to the rotatable base to correspondingly rotate.

Referring still to FIG. 5, the one or more encoders 582 are configured to monitor or measure at least one of position information or direction information of the rotatable base (e.g., rotatable base 320 or rotatable base 420). For example, the one or more encoders 582 can include one or more encoder readers (one or more detectors or sensors such as an optical sensor) which detect markings that are provided on a part (e.g., an encoder strip such as a reflective adhesive strip) disposed on the rotatable base. In some implementations, the one or more encoders 582 are configured to determine the position information based on a number of pulses or square waves generated and/or by counting transitions in reflected light intensity from the reflective adhesive strip. In some implementations, the one or more encoders 582 may include a quadrature encoder having a plurality of encoder readers (detectors or sensors such as optical sensors) which output two signals (corresponding to an "A" channel and a "B" channel as depicted in FIG. 5), such as square waves. For example, the A channel and B channel may be 90 degrees out of phase. The one or more encoders 582 may be configured to determine a direction of rotation of the second portion based on an alternating pattern of the A channel and B channel. Further, in some implementations the one or more encoders 582 can include an index track (corresponding to a "I" channel as depicted in FIG. 5). The index track can be implemented to indicate a direction of rotation via an absolute state change (e.g., a 2-bit state change), and provide a reference point for absolute position information. The one or more encoders 582 may be configured to output one or more first signals indicating at least one of position information or direction information associated with the rotation of the rotatable base when the one or more coils 572 are driven.

The drive control system 5000 may include the one or more first power sources 510 which are configured to supply power to the one or more drive circuits 574. In some implementations, the one or one or more controllers 584 are configured to control the one or more first power sources 510 to supply the power to drive the one or more coils 572 (via the one or more drive circuits 574), based on the one or more first signals output by the one or more encoders 582 and a second signal associated with an input associated with driving the one or more coils 572. The supply of power can be controlled by switching and/or regulating voltage and/or current to control at least one of timing, direction, and magnitude of the voltage and/or current applied to the one or more coils 572. In some implementations, the one or more drive circuits 574 may be embodied as one or more transistors, a half-bridge circuit, or a H-bridge circuit. The H-bridge circuit allows full bidirectional control of current through the one or more coils 572 (e.g., in a first rotational direction and a second rotational direction). In some implementations, the H-bridge circuit can include a snubber circuit (e.g., a triple snubber filter) to dampen voltage transients, suppress ringing or oscillations, improve switching performance, etc. In some implementations, the one or more drive circuits 574 can be configured to supply a voltage to the one or more coils 572 to cause displacement of the scan element of over 90 degrees (e.g., between about 90 degrees and about 150 degrees), the supplied voltage being about 10 volts, or more particularly about 7 volts. In some implementations, the one or more drive circuits 574 can be configured to supply power to the one or more coils 572 to cause displacement of the scan element of over 90 degrees (e.g., between about 90 degrees and about 150 degrees), the supplied power being less than 10 watts, or more particularly less than 5 watts. In some implementations, the one or more controllers 584 may be configured to control the one or more first power sources 510 to vary the power (e.g., by varying current and/or voltage) supplied to drive the one or more coils 572 via the one or more drive circuits 574 to vary a field of view of the scan element between about 0 degrees and about 150 degrees.

FIGS. 6A-6E illustrate example experimental results resulting from operation of the example scanner systems and drive control systems described herein. In some implementations, the one or more controllers 584 are configured to control the one or more drive circuits 574 (e.g., an H-bridge circuit) that causes the second signal associated with driving the one or more coils 572 to be output. Referring to the first experimental result 6100 of FIG. 6A, in some implementations the second signal 6110 can include current pulses through the one or more coils 572 in the form of two opposite-phase square wave signals to alternate a direction of current applied to the one or more coils 572. The one or more controllers 584 may be configured to adjust a control signal provided to the one or more drive circuits 574 based on a position of one or more of the flexure components of the first flexure stage and/or the second flexure stage as derived from the measurements obtained via the one or more encoders 582 and output as the one or more first signals 6120. For example, the pulses associated with the one or more first signals 6120 may be centered with a natural oscillation frequency associated with the flexure components of the first flexure stage and/or the second flexure stage. When the pulses associated with the one or more first signals 6120 are not centered with the natural oscillation frequency associated with the flexure components of the first flexure stage and/or the second flexure stage, the one or more controllers 584 may be configured to adjust the control signal provided to the one or more drive circuits 574 so that the pulses are centered.

In some implementations, the one or more controllers 584 are configured to control the one or more drive circuits 574 (e.g., an H-bridge circuit) that causes the second signal associated with driving the one or more coils 572 to be output. Referring to the second experimental result 6200 of FIG. 6B, in some implementations a 20 kHz pulse-width modulation signal is input to the H-bridge drive circuit to generate a nominal 40 Hz sine drive waveform in the coils 572 (in the results of FIG. 6B, the sine drive is about 47 Hz). Thus, the second signal 6210 can include current pulses through the one or more coils 572 in the form of a sine wave signal having a first frequency (e.g., about 40 Hz) which is generated using pulse-width modulation signal input to the H-bridge circuit having a second frequency (e.g., about 20 kHz). The one or more controllers 584 may be configured to adjust a control signal provided to the one or more drive circuits 574 based on a position of one or more of the flexure components of the first flexure stage and/or the second flexure stage as derived from the measurements obtained via the one or more encoders 582 and output as the one or more first signals 6220. For example, the pulses associated with the one or more first signals 6220 may be centered with a natural oscillation frequency associated with the flexure components of the first flexure stage and/or the second flexure stage. When the pulses associated with the one or more first signals 6220 are not centered with the natural oscillation frequency associated with the flexure components of the first flexure stage and/or the second flexure stage, the one or more controllers 584 may be configured to adjust the control signal provided to the one or more drive circuits 574 so that the pulses are centered.

As described herein, the one or more first signals output by the one or more encoders 582 represents or is indicative of the movement (rotation) of the rotatable base which is coupled with the scan element. That is, the one or more first signals output by the one or more encoders 582 can be used by the one or more controllers 584 to reconstruct a waveform that corresponds to how the rotatable base rotates (e.g., a direction of rotation, position information, speed information, etc.). The one or more controllers 584 may be configured to compare a phase of the one or more first signals and/or reconstructed waveform relative to a phase of a second signal which is associated with driving the one or more coils 572 and the one or more controllers 584 may be configured to adjust an input provided to drive the one or more coils 572 based on the one or more first signals output by the one or more encoders 582 (or the reconstructed waveform) and the second signal associated with driving the one or more coils 572 so that the rotatable base (and correspondingly the scan element), oscillates at the resonant frequency of the flexure components of the first and/or second flexure stages. For example, the one or more controllers 584 may be configured to adjust an input which can include a phase difference between the one or more first signals or reconstructed waveform and the second signal. For example, the one or more controllers 584 may be configured to provide a control input to drive the one or more coils 572 such that the one or more first signals (or reconstructed waveform) are out of phase with the second signal by a predetermined amount (e.g., 90 degrees, 180 degrees, etc.), so that the rotatable base (and correspondingly the scan element), oscillates at the resonant frequency of the flexure components of the first and/or second flexure stages.

In some implementations, the one or more controllers 584 are configured to adjust one or more other inputs (e.g., a frequency associated with the second signal, an amount of power associated with the second signal, etc.), based on the one or more first signals (or the reconstructed waveform) and the second signal associated with driving the one or more coils 572. For example, the one or more controllers 584 may be configured to, based on differences between the one or more first signals output by the one or more encoders 582 and the second signal associated with driving the one or more coils 572, adjust the amount of power so that pulses associated with the one or more first signals are centered with a natural oscillation frequency associated with the flexure components of the first and/or second flexure stages.

The disclosed driving controls for a scanner of a LIDAR system described herein are capable of varying a field-of-view of a scan element on-the-fly and consume low amounts of power (e.g., less than 5 watts). Further, the disclosed driving controls can ensure that the scan element oscillates at the resonant frequency of the flexure components of the first and/or second flexure stages based on information output by the one or more encoders 582 and potentially other feedback control loop mechanisms.

Figure 6A:
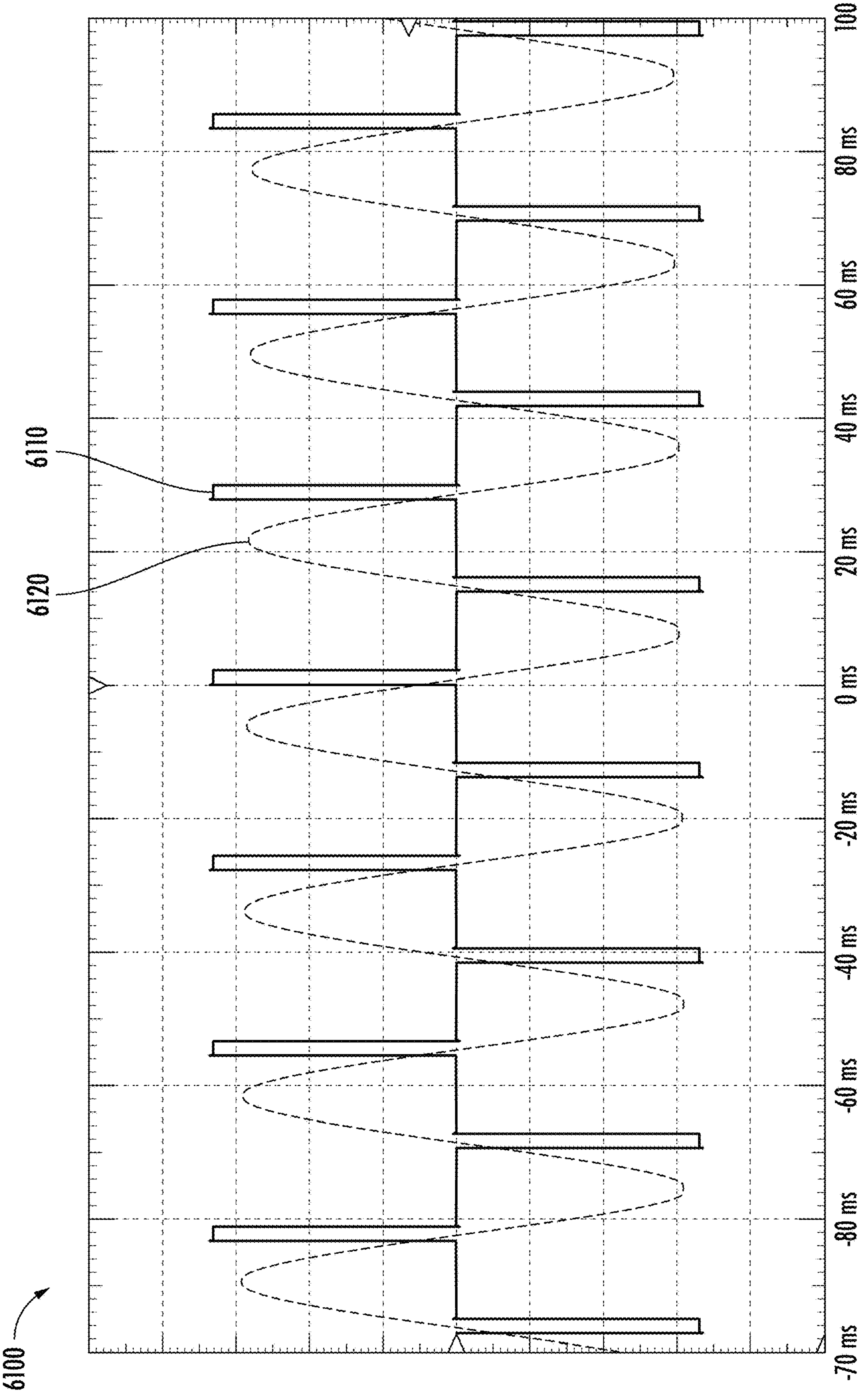
FIGS. 6A-6E illustrate example experimental results through operation of the example scanner system described herein, according to some implementations of the disclosure.
Figure 6B:
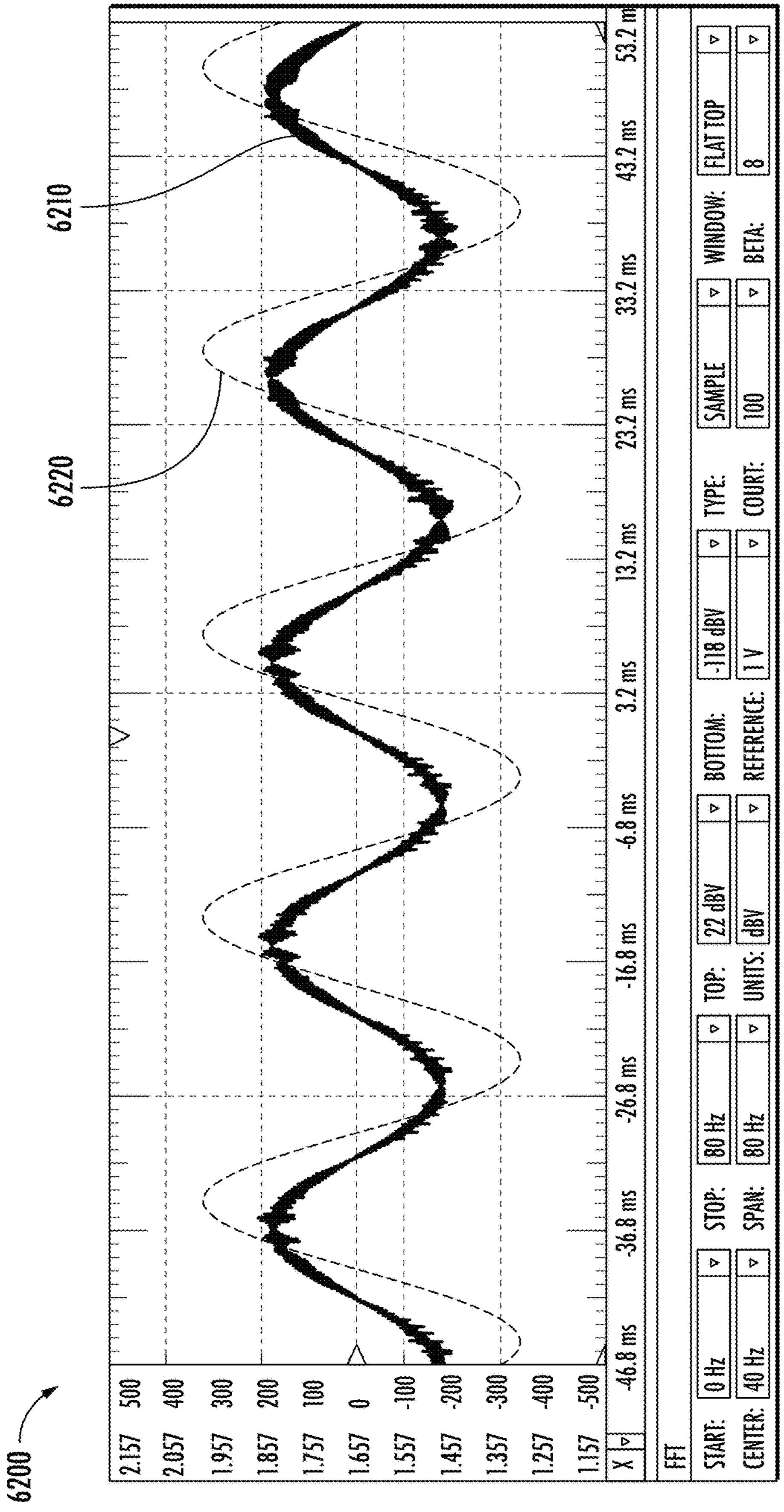
Figure 6C:
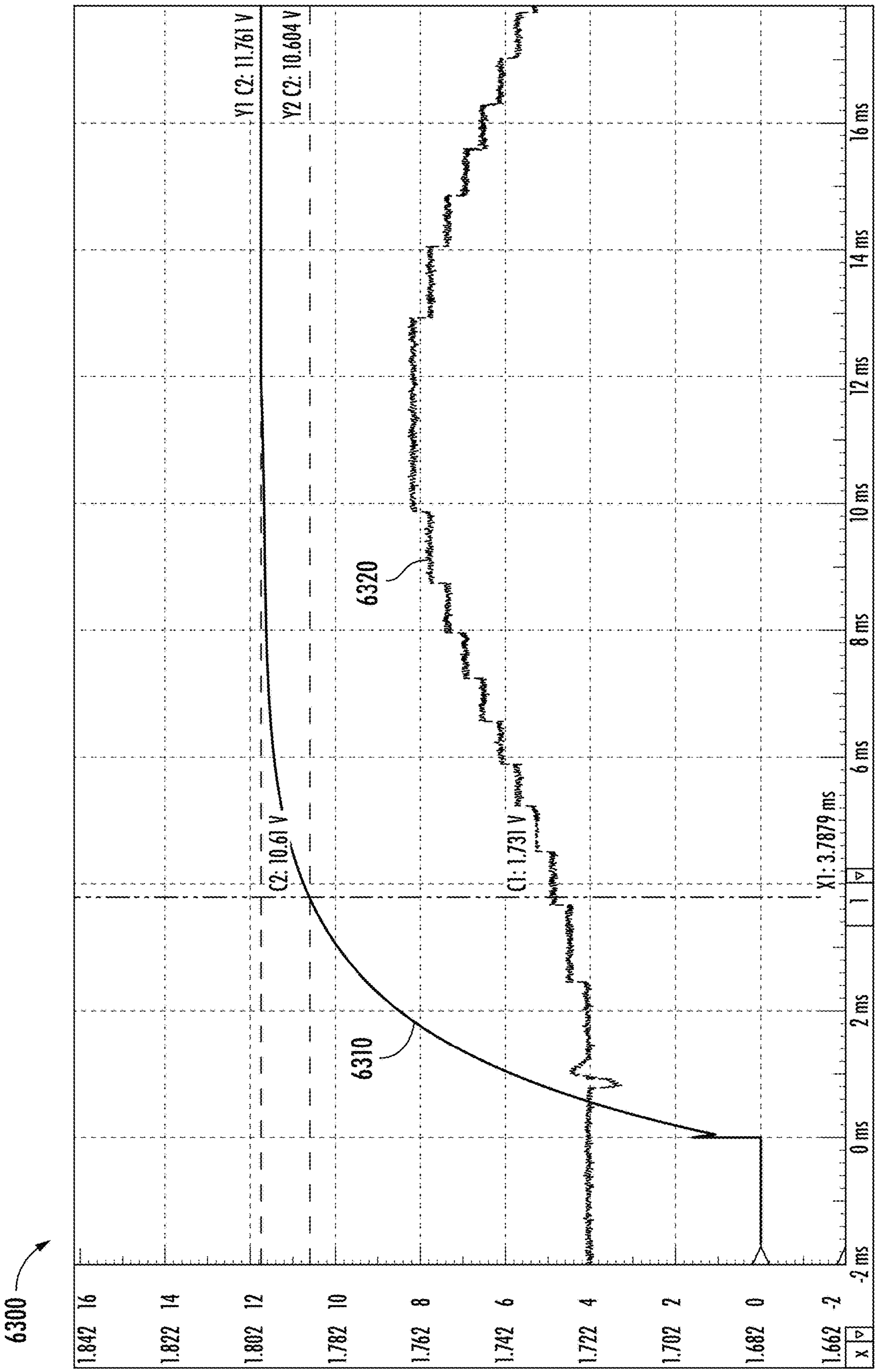

FIG. 6C depicts example third experimental results 6300 of the scanner 3000 and drive control system associated therewith as described herein according to examples of the disclosure. For example, FIG. 6C illustrates a step response graph in which the coil voltage 6310 rises to 90% of the maximum voltage (e.g., of about 12 volts DAC) within about 3.8 ms. The displacement signal 6320 represents displacement of a flexure component monitored via the one or more encoders 582, illustrating that the flexure component can be maximally displaced within about 12 ms.

Figure 6D:
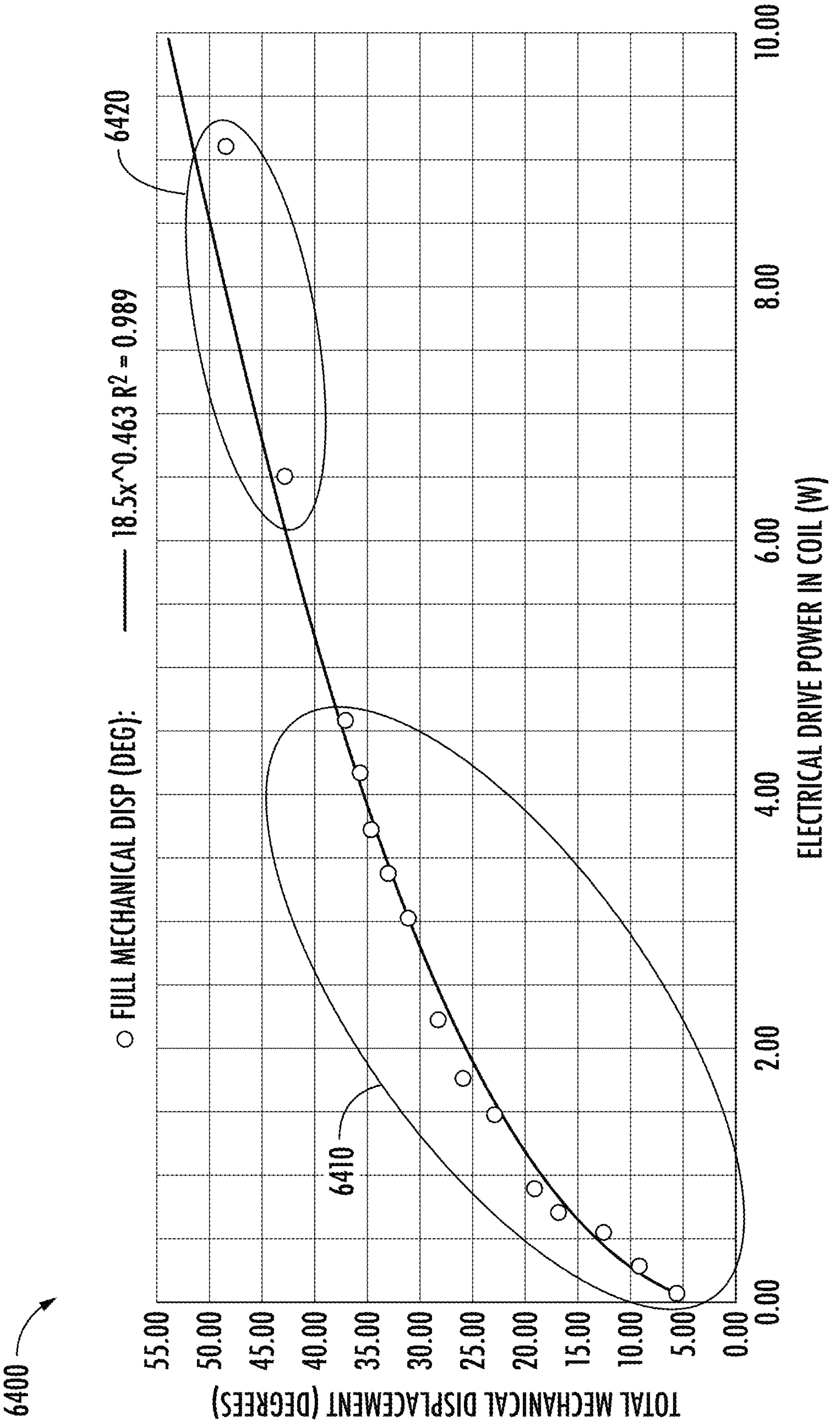

FIG. 6D depicts example fourth experimental results 6400 of the scanner 3000 and drive control system associated therewith as described herein according to examples of the disclosure. For example, in FIG. 6D a first group 6410 of datapoints represent the one or more coils 572 being driven by a first H-bridge drive circuit, where the mechanical displacement of the rotatable base (and correspondingly the scan element) increases to about 35 degrees when about four watts of power are applied to the one or more coils 572. For example, in FIG. 6D a second group 6420 of datapoints represent the one or more coils 572 being driven by a second H-bridge drive circuit, where the mechanical displacement of the rotatable base (and correspondingly the scan element) increases to about 45 degrees when about eight watts of power are applied to the one or more coils 572.

Figure 6E:
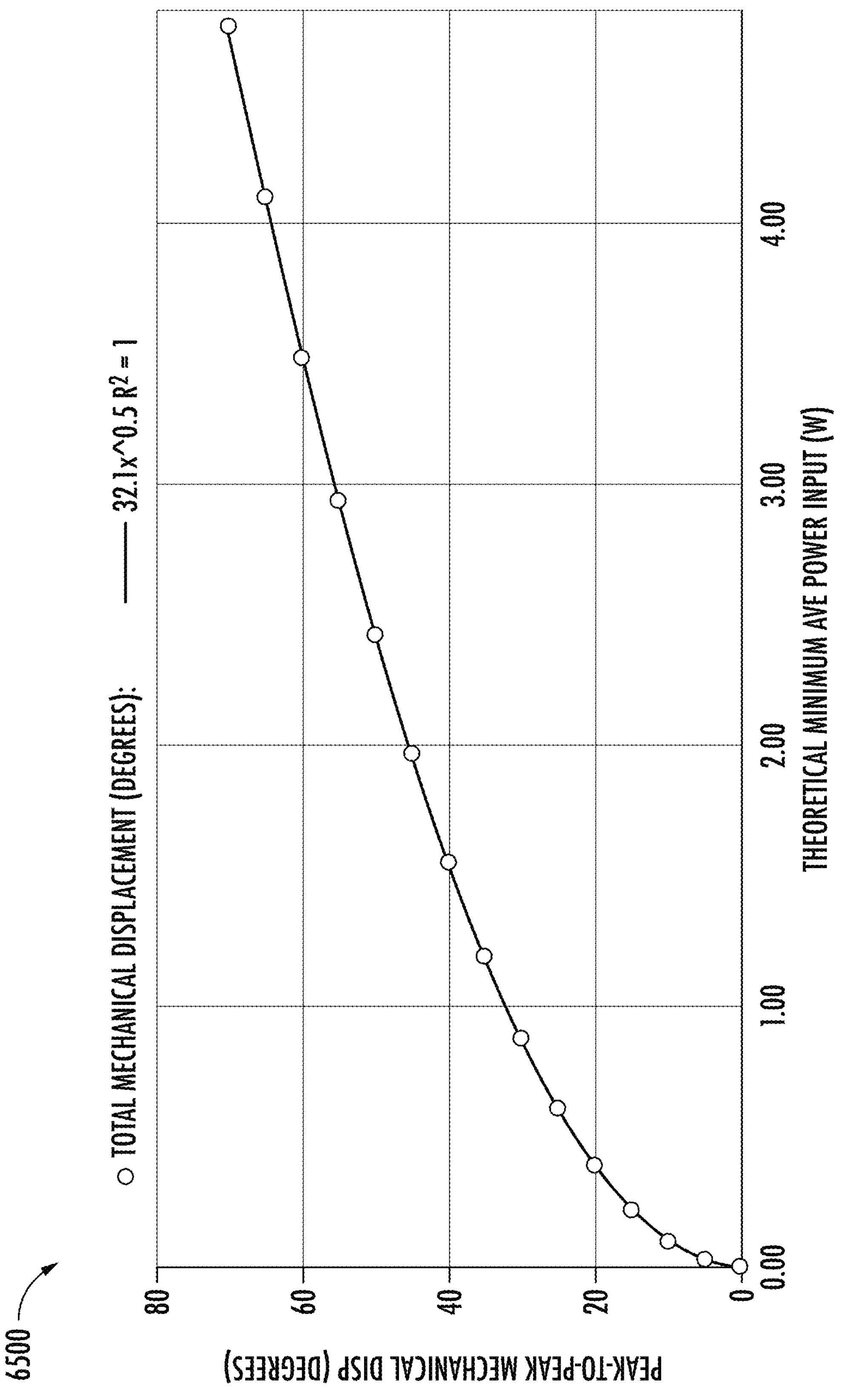

FIG. 6E depicts example analytical results 6500 of the scanner and drive control systems described herein according to examples of the disclosure. For example, in FIG. 6E the graph illustrates theoretical results for total mechanical displacement (in degrees) with a Q-factor of 50, compared to an average power input to the one or more drive coils (e.g., of the scanner 3000). For example, an input power of about 3.5 watts to the one or more coils 572 can result in about 60 degrees in peak-to-peak mechanical displacement of the rotatable base (and correspondingly the scan element). The input power needed to produce 60 degrees in peak-to-peak mechanical displacement of the rotatable base can be reduced by increasing the Q-factor of the scanner. For example, according to examples of the disclosure described herein with respect to FIGS. 3A-4C, displacement of 60 degrees or more can be achieved with less input power by increasing the Q-factor.

Figure 7:
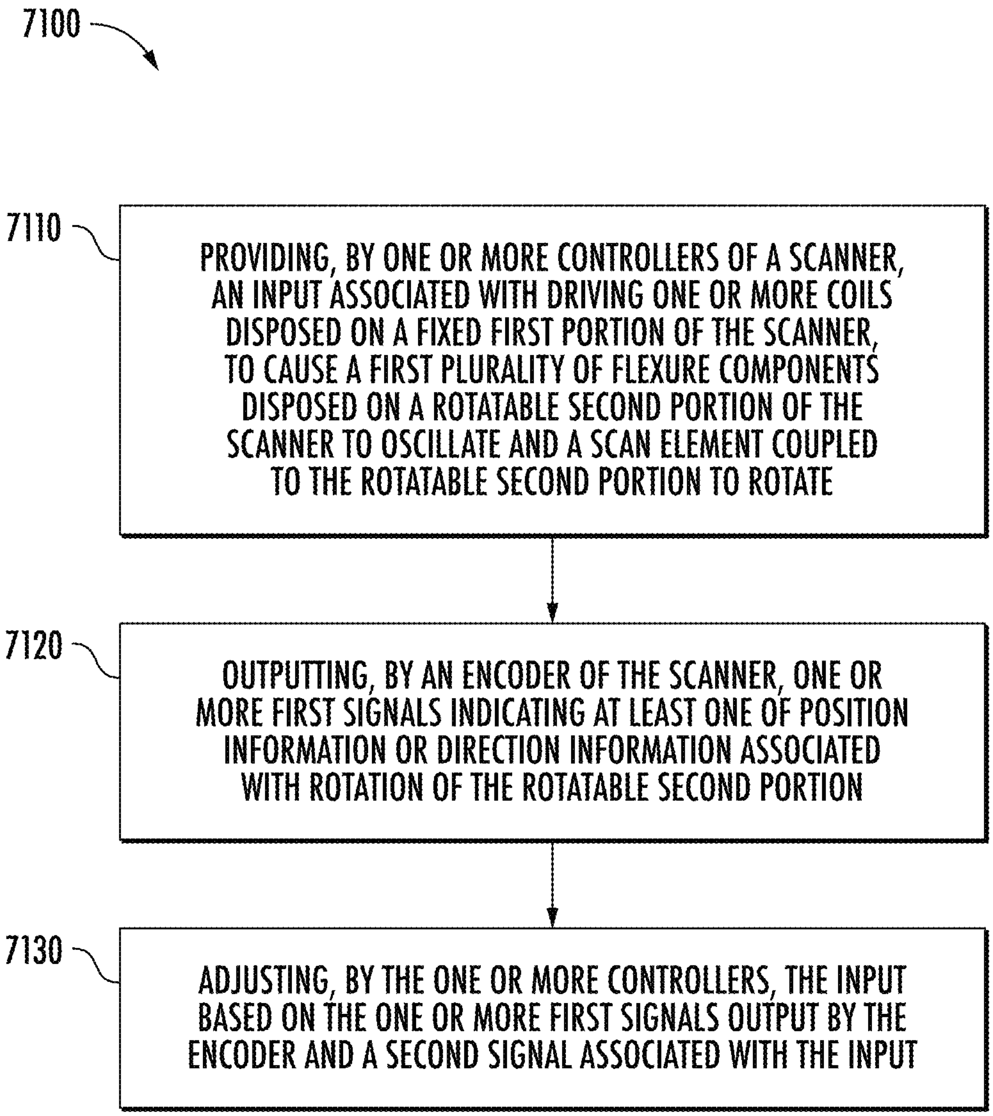
FIGS. 7-8 illustrate flow diagrams of example, non-limiting computer-implemented methods, according to some implementations of the disclosure.

FIG. 7 is a flow chart of an example, non-limiting method 7100 for rotating a scanner of a LIDAR system for a vehicle. Although shown in a particular sequence or order, unless otherwise specified, the order of the operations can be modified. Thus, the illustrated implementation should be understood only as an example, and the illustrated operations can be performed in a different order, and some operations can be performed in parallel. Additionally, one or more operations can be omitted in various implementations. Thus, not all operations are required in every embodiment. Other process flows are possible. The LIDAR system may correspond to the LIDAR system 200 of FIG. 2 and the LIDAR system may include the scanner 3000 of FIGS. 3A-3D or the scanner 4000 of FIGS. 4A-4C and the drive control system 5000 of FIG. 5.

Referring to FIG. 7, at operation 7110, the method 7100 includes providing, by one or more controllers of a scanner, an input associated with driving one or more coils disposed on a fixed first portion of the scanner, to cause a first plurality of flexure components disposed on a rotatable second portion of the scanner to oscillate and a scan element coupled to the rotatable second portion to rotate. For example, the one or more controllers 584 of the scanner may be configured to provide an input associated with driving one or more coils 572. In some implementations, the one or more coils 572 may be disposed on a fixed first portion of the scanner (e.g., the fixed base 310 or the fixed base 410). As described herein, when the one or more coils 572 are driven (e.g., via the one or more drive circuits 374 or the one or more drive circuits associated with FIGS. 4A-4C), a force (torque) is exerted on the one or more magnets disposed at the rotatable second portion of the scanner (e.g., the one or more magnets 325 disposed at the rotatable base 320 or the one or more magnets 425 disposed at the rotatable base 420), thereby causing flexure components of a first flexure stage (e.g., the first flexure stage 3010 or the first flexure stage 4010) and/or a second flexure stage (e.g., the second flexure stage 3020 or the second flexure stage 4020) to oscillate. The scan element is coupled to the rotatable second portion and correspondingly rotates when the rotatable second portion rotates.

At operation 7120, the method 7100 includes outputting, by an encoder of the scanner, one or more first signals indicating at least one of position information or direction information associated with rotation of the rotatable second portion. For example, as described with respect to FIG. 5, the one or more encoders 582 may be configured to output one or more first signals indicating at least one of position information or direction information associated with the rotation of the rotatable base when the one or more coils 572 are driven causing the rotation of the rotatable second portion (e.g., the rotatable base 320 or rotatable base 420).

At operation 7130, the method 7100 includes adjusting, by the one or more controllers, the input based on the one or more first signals output by the encoder and a second signal associated with the input. For example, as described with respect to FIG. 5, the one or more controllers 584 may be configured to adjust the input based on the one or more first signals output by the one or more encoders 582 and a second signal associated with the input (e.g., a driving control signal associated with the one or more drive circuits 574).

In some implementations, the one or more controllers 584 may be configured to control one or more power sources (e.g., one or more first power sources 510) to supply power to drive the one or more coils 572, based on the one or more first signals output by the one or more encoders 582 and the second signal associated with the input. In some implementations, the amount of power may be about 10 watts, for example less than 5 watts (e.g., with a voltage of about twelve volts or in some implementations about seven volts or less).

In some implementations, the input can include a frequency of the second signal. The one or more controllers 584 may be configured to adjust the frequency based on the one or more first signals output by the one or more encoders 582 and the second signal associated with the input.

In some implementations, the input can include a phase of the second signal. The one or more controllers 584 may be configured to compare a phase of the one or more first signals and/or a reconstructed waveform with a phase of the second signal associated with driving the one or more coils 572, and the one or more controllers 584 may be configured to adjust the input (e.g., the phase) associated with driving the one or more coils 572 based on the comparison so that the rotatable second portion (and correspondingly the scan element), oscillates at the resonant frequency of the flexure components.

In some implementations, the one or more controllers 584 are configured to adjust one or more other inputs (e.g., a frequency associated with the second signal, an amount of power associated with the second signal, etc.), based on differences between the one or more first signals (or the reconstructed waveform) and the second signal associated with driving the one or more coils 572. For example, the input corresponds to an amount of power and the one or more controllers 584 may be configured to, based on differences between the one or more first signals output by the encoder 582 and the second signal associated with driving the one or more coils 572, adjust the amount of power so that pulses associated with the second signal are centered with a natural oscillation frequency associated with the flexure components.

Figure 8:
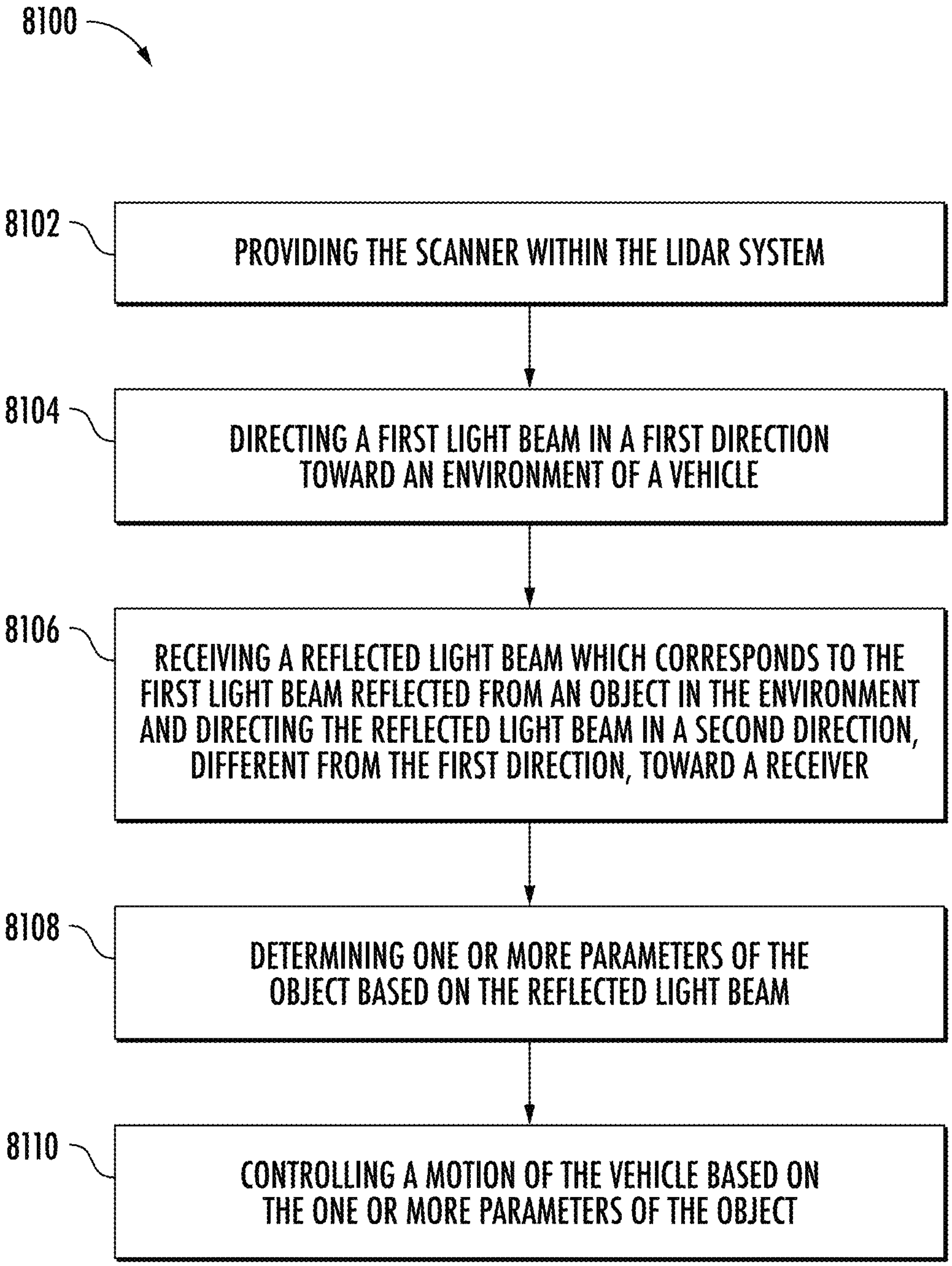

FIG. 8 is a flow chart of an example, non-limiting computer-implemented method 8100 for controlling a vehicle. Although shown in a particular sequence or order, unless otherwise specified, the order of the operations can be modified. Thus, the illustrated implementation should be understood only as an example, and the illustrated operations can be performed in a different order, and some operations can be performed in parallel. Additionally, one or more operations can be omitted in various implementations. Thus, not all operations are required in every implementation. Other process flows are possible.

The method 8100 may include aspects of the method of FIG. 7. However, in some implementations the method 8100 may be an independent method. Referring to FIG. 8, at operation 8102, the method 8100 includes providing a scanner according to the examples described herein (e.g., scanner 3000 or scanner 4000) within the LIDAR system.

At operation 8104, the method 8100 includes directing a first light beam (e.g., via the scanner) in a first direction toward an environment of the vehicle. For example, the first light beam may correspond to outgoing light transmitted via the transmitter 220 in FIG. 2 to the object 218. For example, the scanner may be configured to rotate as described with respect to FIG. 7 while directing the first light beam toward the environment.

At operation 8106, the method 8100 includes receiving a reflected light beam which corresponds to the first light beam reflected from the object in the environment and directing the reflected light beam in a second direction, different from the first direction, toward a receiver (e.g., receiver 222 in FIG. 2). For example, the reflected light beam may correspond to incoming light which has been reflected off object 218 which may be in an environment of the vehicle. Further, the incoming light may be directed toward receiver 222 in FIG. 2.

At operation 8108, the method 8100 includes determining one or more parameters of the object based on the reflected light beam. For example, as described herein, one or more of the parameters of the object (e.g., object 218) can be determined based on sensor data collected by the LIDAR system. For example, the LIDAR system may output sensor data 104 which can be processed by one or more sub-control system(s) 101 shown in FIG. 1 to determine the parameters of the object. For example, the parameters of the object can include map or location data associated with the object, distance information associated with the object, identification or classification information associated with the object, motion information associated with the object, etc.

At operation 8110, the method 8100 includes controlling a motion of the vehicle based on the one or more parameters of the object. For example, as described herein, one or more of the sub-control system(s) 101 shown in FIG. 1 can be implemented to control a motion of the vehicle based on the one or more parameters of the object (e.g., by generating a motion plan, by selecting a motion plan, by controlling braking, acceleration, and/or steering components of the vehicle, etc.).

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the disclosure is by way of example rather than by way of limitation, and the subject disclosure does not preclude inclusion of such modifications, variations or additions to the disclosure as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, numbers, steps, operations, elements, components, or combinations thereof.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The terms "coupled," "fixed," "attached to," and the like refer to both direct coupling, fixing, or attaching, as well as indirect coupling, fixing, or attaching through one or more intermediate components or features, unless otherwise specified herein.

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the disclosure.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blu-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

The foregoing describes the technology of this disclosure within the context of a LIDAR system and an autonomous vehicle for example purposes only. As described herein, the technology described herein is not limited to a LIDAR system or an autonomous vehicle and can be implemented for or within other systems, autonomous platforms, and other computing systems.

What is claimed is:

1. A light detection and ranging (LIDAR) system for a vehicle, the LIDAR system comprising:
- a light source configured to emit light; and
- a scanner including:
  - a fixed first portion,
  - one or more coils disposed on the fixed first portion,
  - a rotatable second portion including one or more magnets and a first plurality of flexure components configured to oscillate in response to the one or more coils being driven,
  - a scan element configured to rotate via rotation of the rotatable second portion and to direct the light emitted by the light source to an environment of the vehicle,
  - an encoder configured to output one or more first signals indicating at least one of position information or direction information associated with rotation of the rotatable second portion when the one or more coils are driven, and
  - one or more controllers configured to provide an input associated with driving the one or more coils and to adjust the input based on the one or more first signals output by the encoder and a second signal associated with the input.

2. The LIDAR system of claim 1, further comprising:
- one or more power sources; and
- wherein the one or more controllers are configured to control the one or more power sources to supply power to drive the one or more coils, based on the one or more first signals output by the encoder and the second signal associated with the input.

3. The LIDAR system of claim 2, wherein the one or more controllers are configured to control the one or more power sources to supply the power to drive the one or more coils to cause displacement of the scan element between about 90 degrees and about 150 degrees.

4. The LIDAR system of claim 2, wherein the one or more controllers are configured to control the one or more power sources to vary the power supplied to drive the one or more coils to vary a field of view of the scan element between about 0 degrees and about 150 degrees.

5. The LIDAR system of claim 1, wherein
- the input comprises a frequency, and
- the one or more controllers are configured to adjust the frequency based on the one or more first signals output by the encoder and the second signal associated with the input.

6. The LIDAR system of claim 1, wherein
- the input comprises an amount of power, and
- the one or more controllers are configured to adjust the amount of power based on the one or more first signals output by the encoder and the second signal associated with the input.

7. The LIDAR system of claim 6, wherein the amount of power is less than ten watts.

8. The LIDAR system of claim 1, wherein
- the input comprises an amount of power, and
- the one or more controllers are configured to, based on differences between the one or more first signals output by the encoder and the second signal associated with the input, adjust the amount of power so that pulses associated with the second signal are centered on a natural oscillation frequency associated with the first plurality of flexure components.

9. The LIDAR system of claim 1, wherein the second signal comprises two opposite-phase square wave signals to alternate a direction of current applied to the one or more coils.

10. The LIDAR system of claim 1, further comprising a drive circuit configured to output the second signal, and wherein the drive circuit comprises a H-bridge circuit.

11. The LIDAR system of claim 1, wherein the second signal comprises a sine wave signal having a first frequency which is generated using pulse-width modulation associated with a second frequency.

12. The LIDAR system of claim 1, wherein the encoder comprises a quadrature encoder configured to output the one or more first signals indicating the position information and the direction information associated with the rotation of the rotatable second portion.

13. The LIDAR system of claim 1, further comprising a drive circuit configured to output the second signal associated with the input, wherein the scanner further includes a second plurality of flexure components coupled to the fixed first portion and the rotatable second portion, and the first plurality of flexure components and the second plurality of flexure components are configured to oscillate in response to a force exerted on the one or more magnets when the one or more controllers control the drive circuit to drive the one or more coils, thereby causing the rotatable second portion to rotate.

14. A computer-implemented method for controlling rotation of a scan element of a scanner for a light detection and ranging (LIDAR) system for a vehicle, the method comprising:

providing, by one or more controllers of the scanner, an input associated with driving one or more coils disposed on a fixed first portion of the scanner, to cause a first plurality of flexure components disposed on a rotatable second portion of the scanner to oscillate and the scan element coupled to the rotatable second portion to rotate;

outputting, by an encoder of the scanner, one or more first signals indicating at least one of position information or direction information associated with rotation of the rotatable second portion; and adjusting, by the one or more controllers, the input based on the one or more first signals output by the encoder and a second signal associated with the input.

15. The computer-implemented method of claim 14, further comprising:

controlling, by the one or more controllers, one or more power sources to supply power to drive the one or more coils, based on the one or more first signals output by the encoder and the second signal associated with the input.

16. The computer-implemented method of claim 14, wherein the input comprises a frequency, and the computer-implemented method further comprises:

adjusting, by the one or more controllers, the frequency based on the one or more first signals output by the encoder and the second signal associated with the input.

17. The computer-implemented method of claim 14, wherein the input comprises an amount of power, and the computer-implemented method further comprises:

adjusting, by the one or more controllers, the amount of power based on the one or more first signals output by the encoder and the second signal associated with the input.

18. The computer-implemented method of claim 14, wherein the input comprises an amount of power, and the computer-implemented method further comprises:

adjusting, by the one or more controllers, the amount of power based on differences between the one or more first signals output by the encoder and the second signal associated with the input, adjust the amount of power so that pulses associated with the second signal are centered on a natural oscillation frequency associated with the first plurality of flexure components.

19. The computer-implemented method of claim 14, wherein the second signal comprises two opposite-phase square wave signals to alternate a direction of current applied to the one or more coils, or the second signal comprises a sine wave signal having a first frequency which is generated using pulse-width modulation associated with a second frequency.

20. An autonomous vehicle, comprising:

an autonomous vehicle control system, the autonomous vehicle control system comprising one or more processors and a Light Detection and Ranging (LIDAR) system, the LIDAR system comprising:

a light source configured to emit light;

a scanner including:

a fixed first portion, one or more coils disposed on the fixed first portion, a rotatable second portion including one or more magnets and a first plurality of flexure components configured to oscillate in response to the one or more coils being driven, a scan element configured to rotate via rotation of the rotatable second portion and to direct the light emitted by the light source to an environment of the autonomous vehicle, an encoder configured to output one or more first signals indicating at least one of position information or direction information associated with rotation of the rotatable second portion when the one or more coils are driven, and one or more controllers configured to provide an input associated with driving the one or more coils and to adjust the input based on the one or more first signals output by the encoder and a second signal associated with the input.

* * * * *